US010728354B2

(12) United States Patent
Kolowich et al.

(10) Patent No.: US 10,728,354 B2
(45) Date of Patent: *Jul. 28, 2020

(54) SLICE-AND-STITCH APPROACH TO EDITING MEDIA (VIDEO OR AUDIO) FOR MULTIMEDIA ONLINE PRESENTATIONS

(71) Applicant: OpenExchange, Inc., Boston, MA (US)

(72) Inventors: Michael E. Kolowich, Sudbury, MA (US); Alexander J. Kieft, Lincoln, MA (US); Andriy Rohalya, Lviv (UA)

(73) Assignee: OpenExchange, Inc., Lincoln, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,763

(22) Filed: Jun. 27, 2018

(65) Prior Publication Data

US 2019/0075181 A1    Mar. 7, 2019

Related U.S. Application Data

(63) Continuation of application No. 14/628,104, filed on Feb. 20, 2015, now Pat. No. 10,033,825.
(Continued)

(51) Int. Cl.
*H04L 29/08*     (2006.01)
*H04N 21/422*    (2011.01)
(Continued)

(52) U.S. Cl.
CPC ..... *H04L 67/2842* (2013.01); *H04N 21/4223* (2013.01); *H04N 21/42203* (2013.01);
(Continued)

(58) Field of Classification Search
CPC .......... H04L 67/2842; H04N 21/42203; H04N 21/4223; H04N 21/4307; H04N 21/4331; H04N 21/44016; H04N 21/8456
See application file for complete search history.

(56) References Cited

U.S. PATENT DOCUMENTS 5,533,903 A    7/1996 Kennedy
5,613,909 A    3/1997 Stelovsky
(Continued)

OTHER PUBLICATIONS

Office Action for U.S. Appl. No. 14/628,104, dated Mar. 24, 2017.
(Continued)

*Primary Examiner* — Jason D Recek
(74) *Attorney, Agent, or Firm* — Hamilton, Brook, Smith & Reynolds, P.C.

(57) ABSTRACT

Systems and methods for driving workflow and dynamic configuration of streaming media in an electronic slide-based presentation may be provided. Software may be provided to create audio/video presentations using a slideshow. A user may record a live audio/video narration of the slideshow. The audio/video narration (e.g. a live stream) may be recorded simultaneously while a user is advancing the slideshow. Markers may be dynamically inserted in real-time as the live stream is recording, for slicing, such that the recording may be split into slices in response to advancing the next slide. Such slices may be mapped to corresponding slides of the slideshow. Re-recordings may be generated such that they can be dynamically stitched as part of the stream. Once the narration is completed, a final audio/video stream recording may be compiled and uploaded to a cloud-based server, where presentation is generated incorporating the slideshow and audio/video recording.

21 Claims, 40 Drawing Sheets

Related U.S. Application Data

(60) Provisional application No. 61/942,858, filed on Feb. 21, 2014.

(51) Int. Cl.
*H04N 21/4223* (2011.01)
*H04N 21/43* (2011.01)
*H04N 21/433* (2011.01)
*H04N 21/44* (2011.01)
*H04N 21/845* (2011.01)

(52) U.S. Cl.
CPC ..... *H04N 21/4307* (2013.01); *H04N 21/4331* (2013.01); *H04N 21/44016* (2013.01); *H04N 21/8456* (2013.01)

(56) References Cited

U.S. PATENT DOCUMENTS

| | | |
|---|---|---|
| 5,690,496 A | 11/1997 | Kennedy |
| 5,953,005 A | 9/1999 | Liu |
| 6,275,222 B1 | 8/2001 | Desain |
| 6,760,043 B2 | 7/2004 | Markel |
| 6,789,228 B1 | 9/2004 | Merril et al. |
| 6,904,408 B1 | 6/2005 | McCarthy et al. |
| 7,379,848 B2 | 5/2008 | Yu et al. |
| 7,496,845 B2 | 2/2009 | Deutscher et al. |
| 7,689,898 B2 | 3/2010 | Merril et al. |
| 7,739,584 B2 | 6/2010 | Vella et al. |
| 7,851,689 B2 | 12/2010 | Reynolds et al. |
| 7,870,488 B2 | 1/2011 | Kirkpatrick |
| 8,060,463 B1 | 11/2011 | Spiegel |
| 8,401,163 B1 | 3/2013 | Kirchhoff et al. |
| 9,219,790 B1* | 12/2015 | Filev .................. H04L 67/22 |
| 9,372,735 B2 | 6/2016 | Calder et al. |
| 9,633,358 B2 | 4/2017 | Kolowich et al. |
| 10,033,825 B2 | 7/2018 | Kolowich et al. |
| 2002/0120939 A1 | 8/2002 | Wall et al. |
| 2002/0174134 A1* | 11/2002 | Goykhman ............ G06Q 10/06 |
| 2003/0174160 A1* | 9/2003 | Deutscher ......... H04N 5/44543 |
| | | 715/716 |
| 2004/0133909 A1 | 7/2004 | Ma |
| 2004/0267612 A1 | 12/2004 | Veach |
| 2005/0257158 A1 | 11/2005 | Lombardo |
| 2006/0064643 A1 | 3/2006 | Hariton |
| 2006/0129908 A1 | 6/2006 | Markel |
| 2007/0118801 A1 | 5/2007 | Harshbarger et al. |
| 2007/0214431 A1 | 9/2007 | Amadio et al. |
| 2007/0240230 A1 | 10/2007 | O'Connell et al. |
| 2007/0244739 A1 | 10/2007 | Soito et al. |
| 2007/0244985 A1 | 10/2007 | Svendsen |
| 2008/0028026 A1 | 1/2008 | Chen et al. |
| 2008/0065977 A1 | 3/2008 | Gottlieb et al. |
| 2008/0091778 A1 | 4/2008 | Ivashin et al. |
| 2008/0092159 A1 | 4/2008 | Dmitriev et al. |
| 2008/0104503 A1 | 5/2008 | Beall et al. |
| 2008/0162713 A1* | 7/2008 | Bowra ............... H04N 21/4344 |
| | | 709/231 |
| 2008/0201348 A1 | 8/2008 | Edmonds et al. |
| 2008/0313011 A1 | 12/2008 | Rose et al. |
| 2008/0320378 A1 | 12/2008 | Shuter et al. |
| 2009/0063945 A1 | 3/2009 | Bhogal et al. |
| 2009/0066722 A1 | 3/2009 | Kriger et al. |
| 2009/0083288 A1 | 3/2009 | LeDain et al. |
| 2009/0222551 A1 | 9/2009 | Neely et al. |
| 2009/0265196 A1 | 10/2009 | Dewar et al. |
| 2010/0214323 A1 | 8/2010 | Sakaue |
| 2010/0281378 A1 | 11/2010 | Pendergast et al. |
| 2010/0281386 A1 | 11/2010 | Lyons et al. |
| 2010/0287134 A1 | 11/2010 | Hauser |
| 2010/0318916 A1 | 12/2010 | Wilkins |
| 2010/0328465 A1 | 12/2010 | Merril et al. |
| 2011/0004898 A1 | 1/2011 | Ritter |
| 2011/0225036 A1 | 9/2011 | Reddy et al. |
| 2011/0283243 A1 | 11/2011 | Eckhardt et al. |
| 2012/0023407 A1 | 1/2012 | Taylor |
| 2012/0192106 A1 | 7/2012 | Kieft et al. |
| 2014/0143437 A1* | 5/2014 | Mathur ............... H04N 21/2187 |
| | | 709/231 |
| 2014/0278746 A1 | 9/2014 | Kolowich et al. |
| 2014/0282013 A1* | 9/2014 | Amijee ............... G06F 16/4393 |
| | | 715/732 |
| 2015/0244758 A1 | 8/2015 | Kolowich et al. |
| 2017/0053673 A1* | 2/2017 | Gordon ........... H04N 21/23412 |
| 2017/0286976 A1 | 10/2017 | Kolowich et al. |

OTHER PUBLICATIONS

Final Office Action of U.S. Appl. No. 14/628,104, dated Nov. 3, 2017.

Notice of Allowance for U.S. Appl. No. 14/628,104, dated May 22, 2018.

* cited by examiner

SLICE-AND-STITCH APPROACH TO EDITING MEDIA (VIDEO OR AUDIO) FOR MULTIMEDIA ONLINE PRESENTATIONS

RELATED APPLICATIONS

This application is a continuation of U.S. application Ser. No. 14/628,104, filed on Feb. 20, 2015, which claims the benefit of U.S. Provisional Application No. 61/942,858, filed on Feb. 21, 2014. This application is related to U.S. application Ser. No. 13/303,820, filed on Nov. 23, 2011 and to U.S. application Ser. No. 13/838,136, filed on Mar. 15, 2013. The entire teachings of the above applications are incorporated herein by reference.

BACKGROUND

As bandwidth has increased over the years, content providers have trended toward producing interactive presentations with rich media. Rich media production software allows content providers to create and deliver engaging interactive presentations quickly and effectively. Interactive content in a presentation may be prerecorded or part of a live performance. For example, a broadcast or webinar may be a live or recorded multimedia presentation. Online multimedia may be downloaded or streamed. Streaming multimedia may be live or on-demand.

SUMMARY

While various technologies exist to incorporate streaming media in interactive presentations, limitations remain. For example, the ability to make changes to a streaming video/audio being recorded can be difficult. Often professionals are employed to make changes to streaming media, and this can be cost prohibitive. In addition, memory and storage resource challenges make editing of streaming media difficult, especially in the mobile environment.

Systems and methods may be provided for enabling pre-processed media slicing and stitching technology for use in an electronic presentation production environment. In an example implementation of the inventive pre-processed media slicing (also referred to as segmenting or dividing) and stitching, the client application can be configured to generate a single, continuous output media file and slide change time markers, composed of media stream segments (also referred to as slices) split out from the original recorded files. After each media file is recorded, it is split into one or more separate media files that correspond with each slide image, based on the time markers indicated by the user during the recording process. These split media files are stored locally on the client device's memory storage, until the point when the user indicates that she has finished recording. At this point, the client application stitches together the individual split media files into a single output media file, and records the time markers of each slide change relative to the media file's timeline.

Systems and methods for driving workflow and dynamic configuration of a video stream in an electronic slide-based presentation may be provided. Computer software, such as a mobile app, may be configured to enable a user to create audio/video presentations using a slideshow, such as a PowerPoint presentation. The app is implemented in a mobile device, such as an iPad or other tablet computer. In one example embodiment, a user uploads a slideshow to a cloud-based server. Once uploaded, the user begins recording an audio/video narration of the slideshow. The audio/video narration (live stream) may be stored in a local cache, such that it is available for offline accessibility. During the live stream recording, the user narrates the slideshow while advancing the slideshow by clicking a "next slide" button. The application dynamically inserts markers for slicing so that the recording may be split into slices in response to the "next slide" command. Those slices may be mapped to corresponding slides of the slideshow. The user has the option to record and re-record any subset of the slides, and then select which recordings to compile into a final narration. Any re-recordings are generated such that they can be dynamically stitched as part of the live stream recording. Once the narration is completed, a final audio/video live stream recording is compiled and uploaded to the cloud-based server, where a final presentation is generated to incorporate the slideshow and the audio/video recording.

A system may be provided for automated production of an audio/video live stream based slideshow. The system may include accommodation of a live recording stream, and powerful editing options for the user. The user may select any slide to begin recording, and during recording may advance though any number of slides with a "next slide" button. The user may re-record for any slide by selecting it, and continue using the "next slide" button. Recordings and re-recordings are maintained simultaneously in layers, and slices from any of the layers can be selected for stitching together in a final cut. The system may also include automated mapping of slices to a slideshow, as well as automated stitching of video slices into a final video production with slides.

Implementation in a mobile device and touch-screen environment is also considered, along with optimization for the bandwidth limitations of a mobile device. For example, video recording and editing may be handled by the local caching engine, and final production is uploaded to the cloud-based server. In addition, an "Offline mode" is considered, in which a presentation can be pre-loaded for working without a connection to the cloud-based server.

Systems and methods for driving workflow and dynamic configuration of streaming media in an electronic slide-based presentation may be provided. Computer software, such as a mobile app, may be configured with a preprocessor to enable a user to create audio/video presentations using a slideshow, such as a PowerPoint presentation. The app is implemented in a mobile device, such as an iPad or other tablet computer. In one example, embodiment, a user uploads a slideshow to a cloud-based server. Once uploaded, the user begins recording an audio/video narration of the slideshow. The audio/video narration (live stream) maybe stored in a local cache, such that it is available for offline accessibility. During the live stream recording, the user narrates the slideshow while advancing the slideshow by clicking a "next slide" button. The application dynamically inserts markers for slicing so that the recording may be split into slices in response to the "next slide" command.

Slices may be mapped to corresponding slides of the slideshow. The user has the option to record and re-record any subset of the slides, and then select which recordings to compile into a final narration. Any re-recordings are generated such that they can be dynamically stitched as part of the stream recording. Once the narration is completed, a final audio/video stream recording is compiled and uploaded to the cloud-based server, where a final presentation is generated to incorporate the slideshow and the audio/video recording.

A system may be provided for automated production of an audio/video stream based slideshow. The system may include accommodation of a live recording stream, and powerful editing options (e.g. a preprocessor) for editing of live streaming media. The user may select any slide to begin recording, and during recording may advance though any number of slides with a "next slide" button. The user may re-record for any slide by selecting it, and continue using a "next slide" button. Recordings and re-recordings are maintained simultaneously in layers, and slices from any of the layers can be selected for stitching together in a final cut.

The system may also include automated mapping of slices to a slideshow, as well as automated preprocessor stitching of live stream video slices into a final video production with slides. Implementation in a mobile device or touch-screen environment is also considered, along with optimization for the bandwidth limitations of a mobile device.

For example, video recording and editing may be handled by the local caching engine, and final production is uploaded to the cloud-based server. In addition, an "Offline mode" is considered, in which a presentation can be pre-loaded for working without a connection to the cloud-based server.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Digital Processing Environment

Figure 1A:
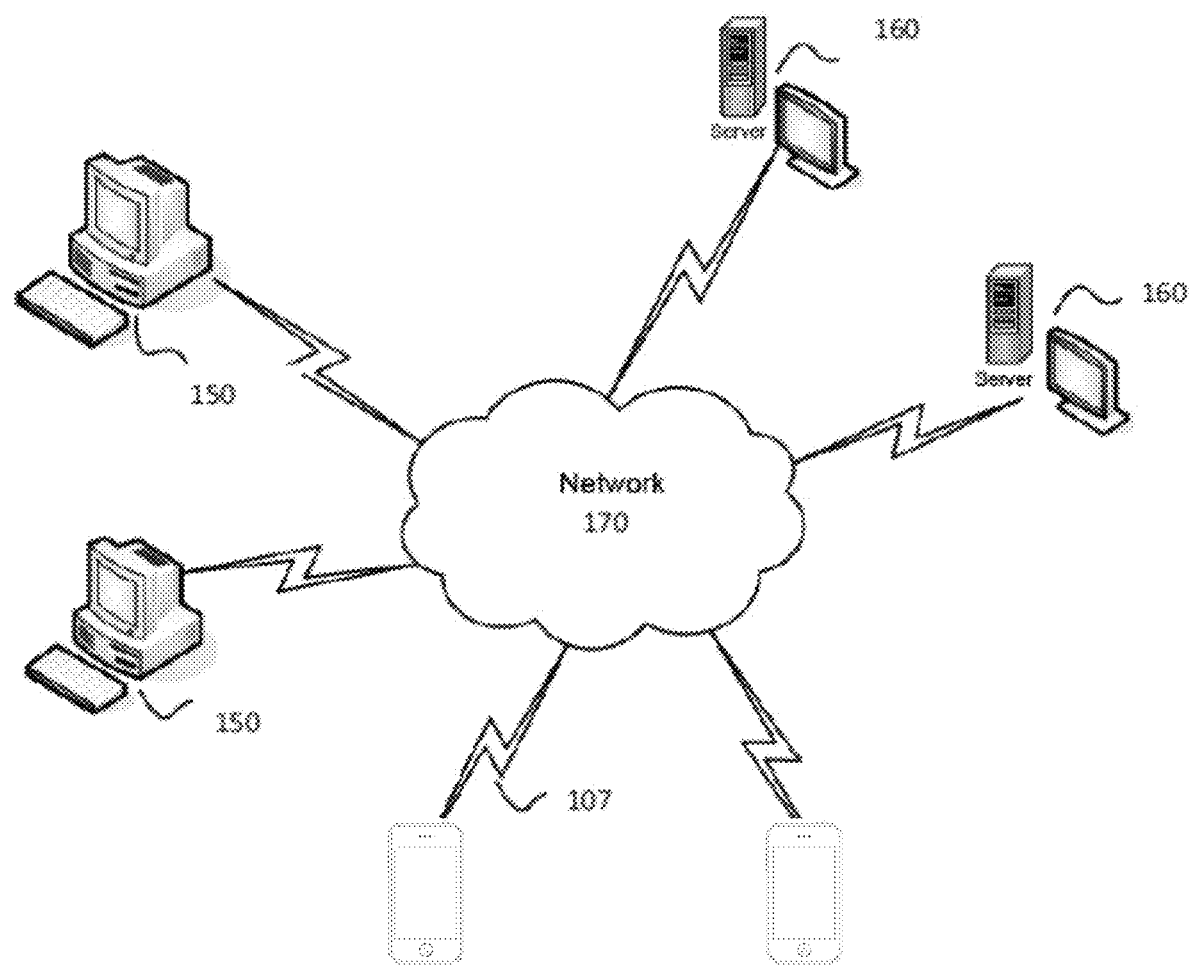
FIG. 1A is a schematic diagram of an example computer network environment in which embodiments are deployed.

Example implementations of a production system for creating and updating audio/video streaming media based slide presentations may be implemented in a software, firmware, or hardware environment. FIG. 1A illustrates one such environment. Client computer(s)/devices 150 (e.g. mobile phone) and a cloud based server 160 (or cluster thereof) provide processing, storage, and input/output devices executing application programs and the like.

Client computer(s)/devices 150 are linked through communications network 170 to other computing devices, including other client devices/processes 150 and server computer(s) 160. Communications network 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Several computers 160 may be configured to facilitate implementation of a production system for creating and updating an audio/video streaming media based slide presentation, which is processed and played at client computer(s)/devices 150. In one example embodiment, one or more of the servers 160 are Java application servers. The Java application servers 160 are scalable such that if there are spikes in traffic, the servers can handle the load increase. The Java application servers 160 may be configured to write to databases (such as a DynamoDB) regarding dynamic stitching instructions related to a stream-based presentation being edited at client computer(s)/devices 150. A second set of servers may be provided to maintain a queue, which tracks and responds to client interaction with the stream-based presentation.

Figure 1B:
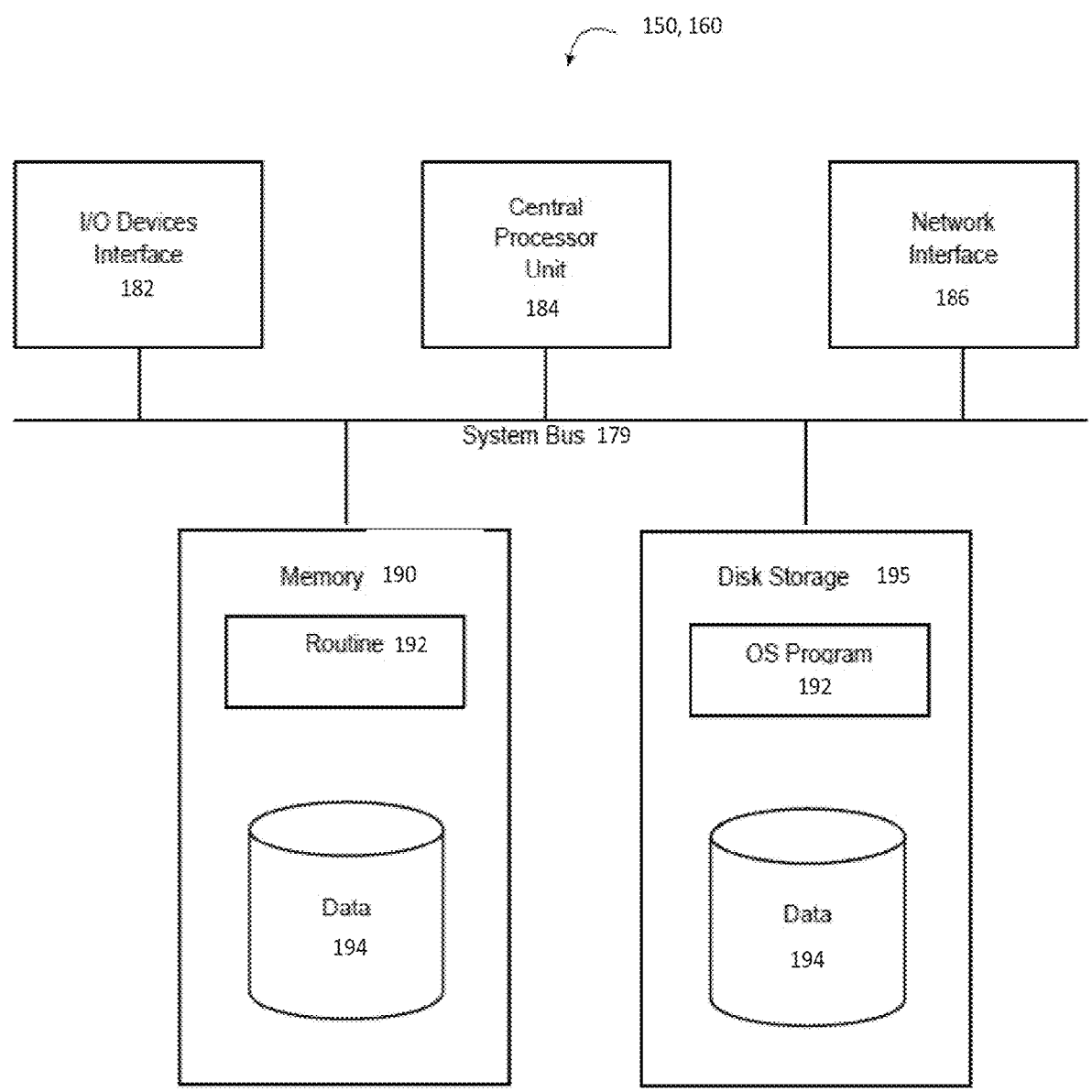
FIG. 1B is a block diagram of the computer nodes in the network of FIG. 1A.

Embodiments of the invention may include means for displaying, editing, and stitching audio, video or data signal information. FIG. 1B is a diagram of the internal structure of a computer/computing node (e.g., client processor/device/mobile phone device/tablet 150 or server computers 160) in the processing environment of FIG. 1A, which may be used to facilitate displaying such audio, video or data signal information. Each computer/server 150, 160 contains a system bus 179, where a bus is a set of actual or virtual hardware lines used for data transfer among the components of a computer or processing system. Bus 179 is essentially a shared conduit that connects different elements of a computer system (e.g., processor, disk storage, memory, input/output ports, etc.) that enables the transfer of data between the elements. Attached to system bus 179 is I/O device interface 182 for connecting various input and output devices (e.g., keyboard, mouse, touch screen interface, displays, printers, speakers, etc.) to the computer 150, 160. Network interface 186 allows the computer to connect to various other devices attached to a network (for example the network illustrated at 170 of FIG. 1A). Memory 190 provides volatile storage for computer software instructions 192 and data 194 used to implement a software implementation of the present invention (e.g. production system for creating and updating an audio/video stream based slide presentation).

Disk storage 195 provides non-volatile storage for computer software instructions 192 (equivalently "OS program") and data 194 used to implement embodiments of the streaming media slide based production system of the present invention. Central processor unit 184 is also attached to system bus 179 and provides for the execution of computer instructions.

In one embodiment, the processor routines 192 and data 194 are a computer program product, the stream slide based presentation production system (generally referenced 192), including a computer readable medium capable of being stored on a non-volatile storage device 195, which provides at least a portion of the software instructions for the stream slide based presentation production system. Instances of the stream slide based presentation production system including the stitching/pre-processor engines and other software embodiments of the streaming media slide based production system, such as instances of the presentation development environments may be implemented as a computer program product 192, and can be installed by any suitable software installation procedure, as is well known in the art. In another embodiment, at least a portion of the live stream slide based presentation production system instructions may also be downloaded over a cable, communication and/or wireless connection. In other embodiments, the streaming media slide based production system software components, such as instances of the player, may be implemented as a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present streaming media slide based production system invention routines/program 192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 192 is a propagation medium that the computer system 150 may receive and read, such as by receiving the propagation medium and identifying a propagated signal embodied in the propagation medium, as described above for computer program propagated signal product.

The production system for creating and updating an audio/video streaming media based slide presentation described herein may be configured using any known programming language, including any high-level, object-oriented programming language. The production system for creating and updating an audio/video streaming media based slide presentation may include instances of a runtime stitching engine and player. The player may be implemented via a software embodiment and may operate within a browser session.

The production system for creating and updating an audio/video streaming media based slide presentation, for example, may be developed using HTML code, JavaScript and Flash. The HTML code may be configured to embed the system into a web browsing session at a client 150. The Java Script can be configured to perform clickstream and session tracking at the client 150 and store the streaming media recordings and editing data in a cache. In another embodiment, the system may be implemented in HTML 5 for client devices 150 that do not have Flash installed.

The player may be configured to load an XML, data file with information about where components of the stream-based presentation are stored or hosted, such as video, images, and timing information, footnote, attachments, interactive components, style sheets, etc.

In an example mobile implementation, the user interface framework for a player for depicting the streaming media based presentation may be based on XHP, Javelin and WURFL. In another example mobile implementation for OS X and iOS operating systems and their respective APIs, Cocoa and Cocoa Touch may be used to implement the player using Objective-C or any other high-level programming language that adds Smalltalk-style messaging to the C programming language.

System Architecture

The invention may include a production environment (platform/system) for creating and updating an audio/video streaming media based slide presentation according to an embodiment of the invention. In one example, the production environment is implemented as a mobile app, and may include a runtime stitching engine and player clients. The run-time stitching engine and player clients are instances of client side software operating on respective client systems 150 of viewers/visitors. The production system for creating and updating an audio/video streaming media based slide presentation, e.g. run-time stitching and preprocessing engines for example, can be configured to process edits made to streaming media presentation content, load the slides, and manage/monitor events associated with the session.

The production system for creating and updating an audio/video streaming media based slide presentation may be configured and managed by a service that provides instances of presentation authoring apps to clients, which may be used by content providers to implement and manage their respective audio/video streaming media based slide presentations.

The streaming media video/audio slide based production service allows content providers to create, dynamically edit, and configure their streaming media based slide presentations as they are being recorded. The streaming media based slide presentations may further include enhanced tracking, monitoring and event triggering features.

Figure 1C:
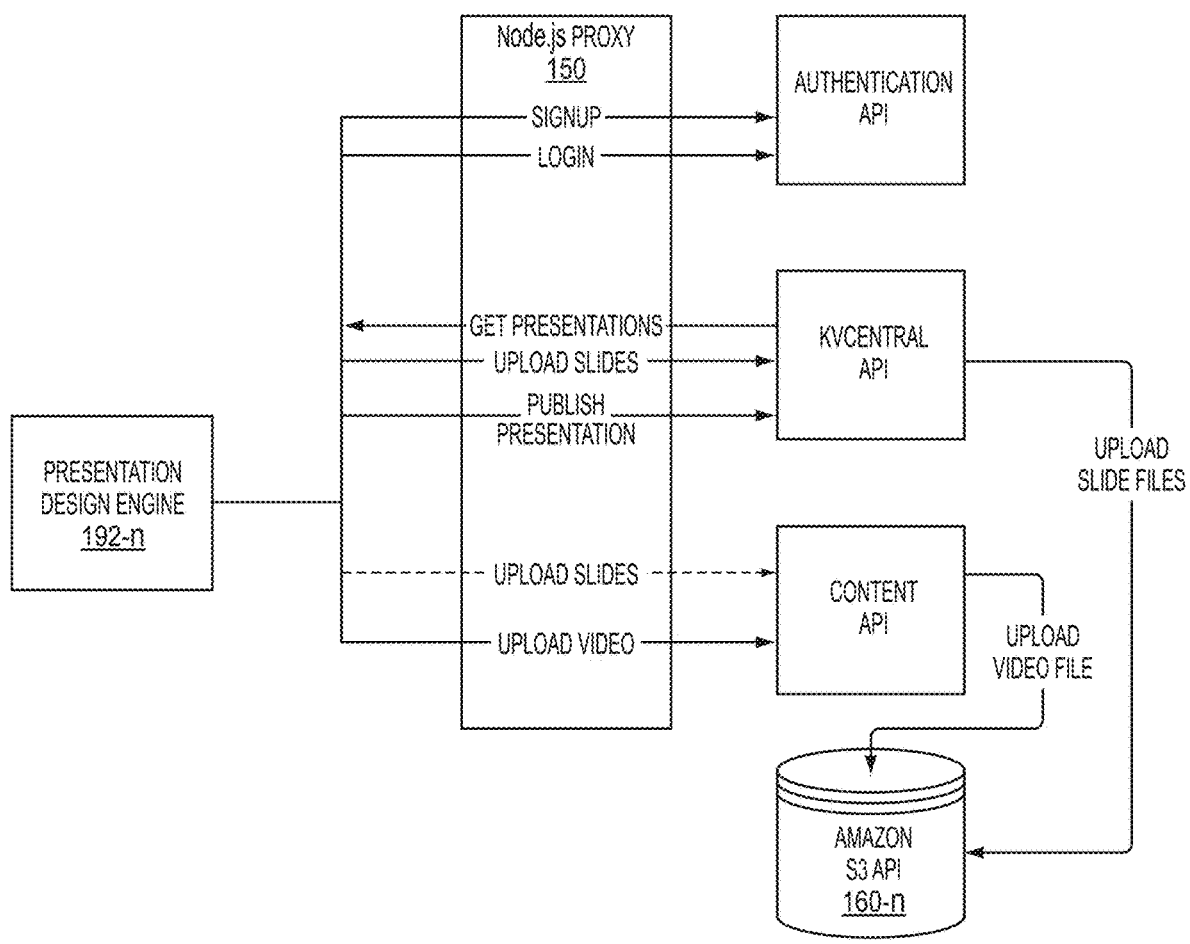
FIG. 1C shows a diagram of an example implementation of system architecture according to an embodiment.

FIG. 1C shows a diagram of an example implementation of a system architecture according to an embodiment. At 192-n, an instance of the presentation design engine is shown. The engine 192 may include a live stream preprocessor/media stitcher and recorder, which are components that may be executed at a client device 150. A session may be established with the client 150 via the server 160. In another embodiment, the client 150 may communicate with the server 160 to access the presentation design engine 192 via a virtual private network (VPN). The client 150 may communicate with the server 160 via central application programming interface (API) to push and/or pull presentations, media assets, slides. The client 150 may further push live video stream content through a content API to the server 160.

Media Stitching Recording Workflows

Figure 2A:
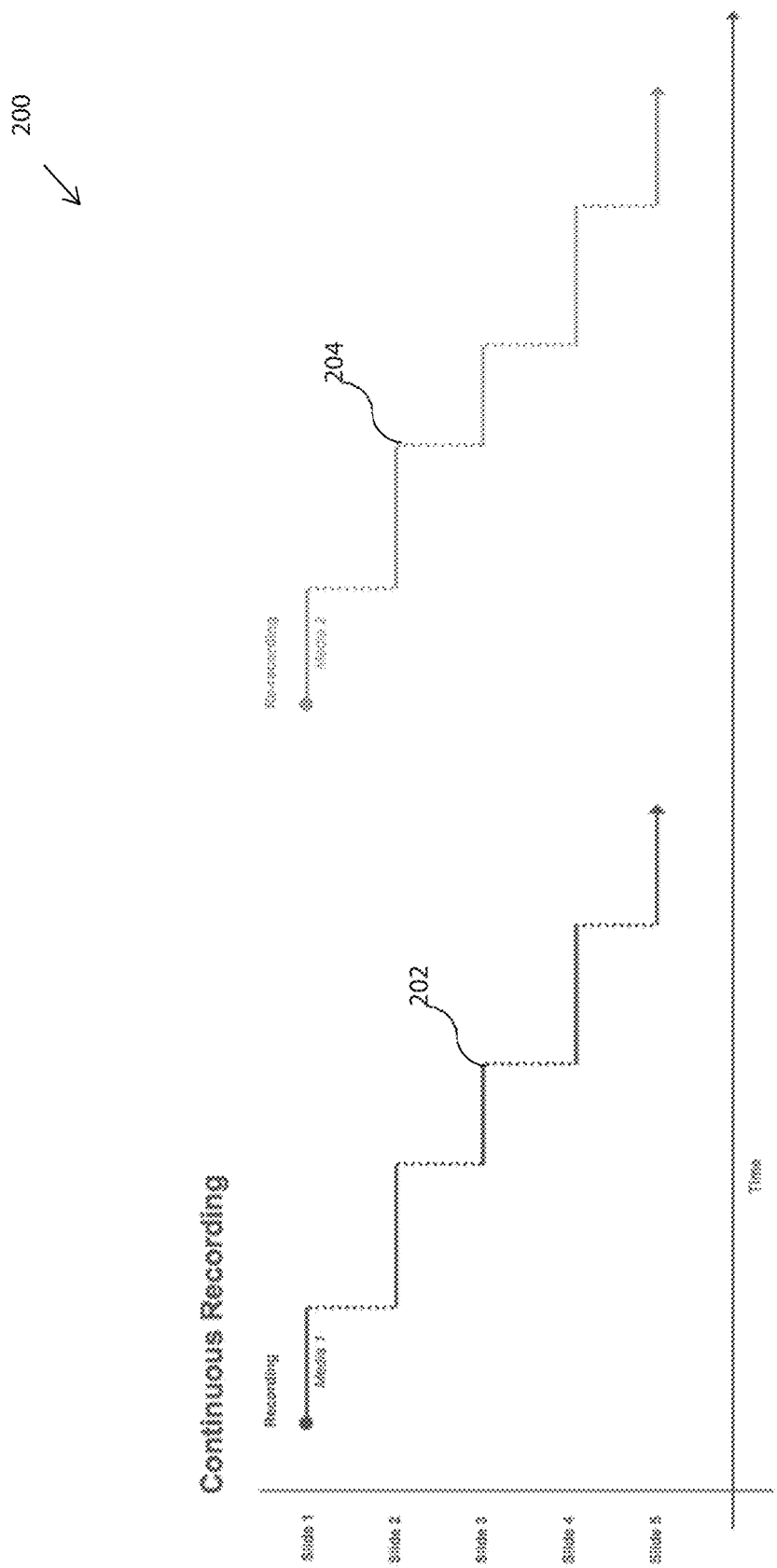
FIGS. 2A-2G are diagrams of example media stitching workflows according to certain embodiments of the production system for creating and updating an audio/video media stream based slide presentation.
Figure 2B:
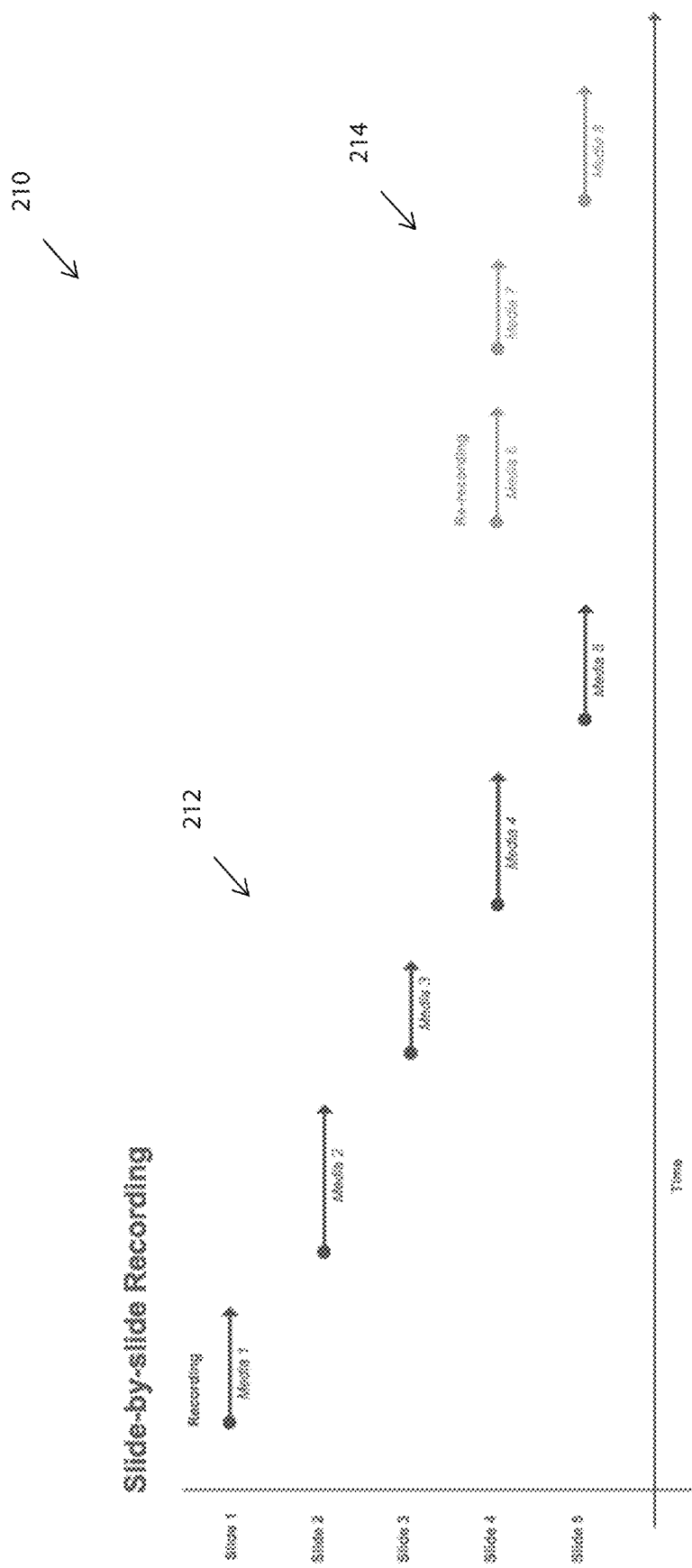
Figure 2C:
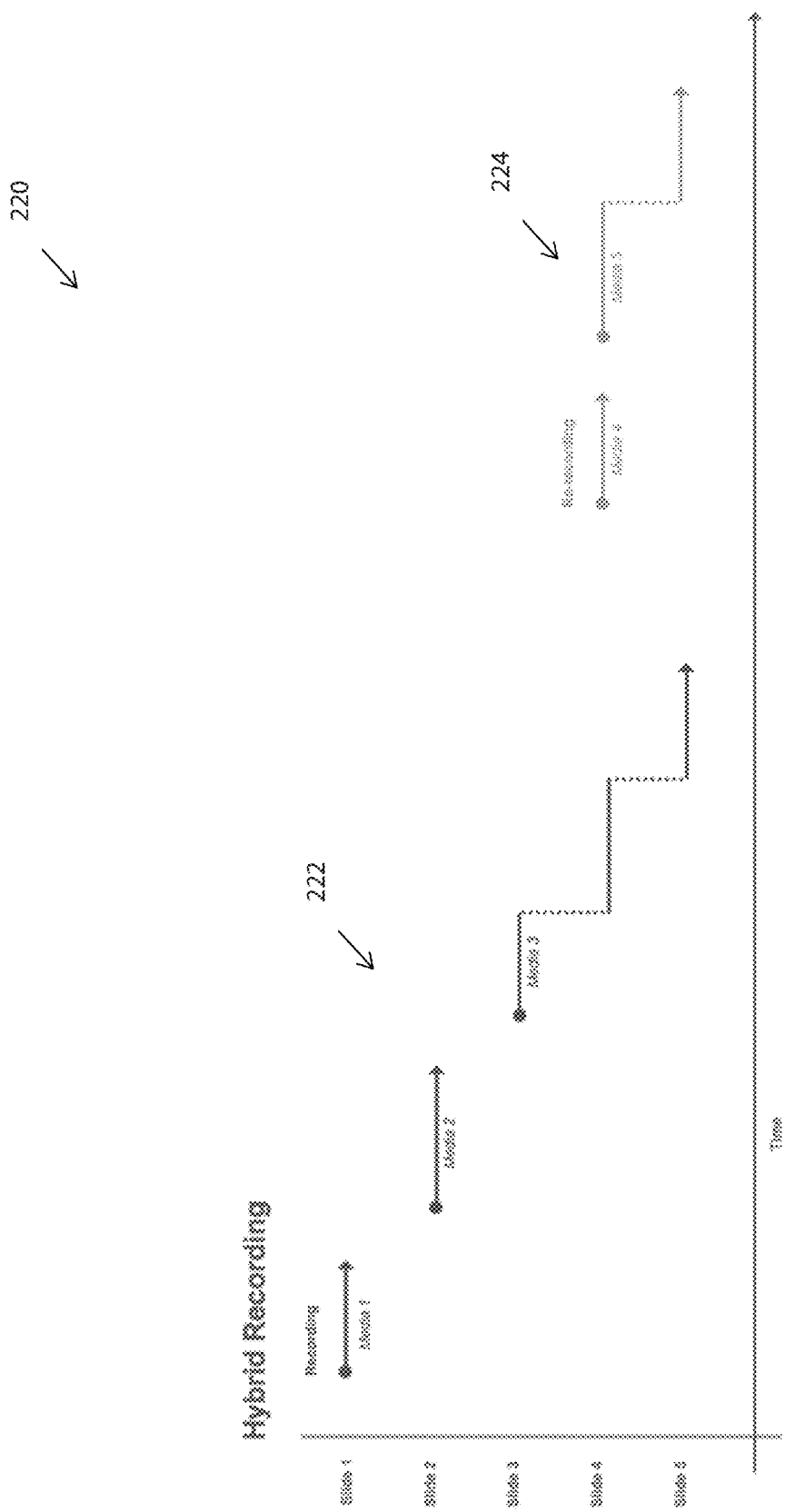

The diagrams in FIGS. 2A, 2B, and 2C illustrate three example user interface workflows 200, 210, and 220, respectively for recording media streams in synchronization with slide images. A workflow, for instance, may involve a particular sequence of tasks in an execution stream (or executing threads).

The first example workflow shown in FIG. 2A, Continuous Recording 200, allows the user to record a single, uninterrupted media stream, during which the user marks the time for each slide change (green) 202. If the user wishes to re-record any part of the media, this example embodiment workflow 200 requires that she starts over from the beginning and re-records a new continuous media stream for all of the slide images (orange) 204.

The second example workflow shown in FIG. 2B, Slide-by-slide Recording 210, allows the user to record individual media streams for each slide image (green) 212. The user pauses between each slide before starting the next, creating a gap in the media recording at each slide change. The user does not mark the time of slide changes during the recording. If the user wishes to re-record part of the media, she may re-record an individual media stream for a particular slide, without needing to re-record all of the media streams (orange) 214. Re-recording also does not permit the user to record continuously from one slide image to the next.

The third example workflow, Hybrid Recording 220, allows the user to record individual media streams for each slide image or uninterrupted media streams for multiple slide images, where each slide change is marked by the user during the recording (green) 222. If the user wishes to re-record part of the media, she may choose either to re-record an individual media stream for a particular slide, or record continuously over multiple slide images (orange) 224.

Media Stitching Workflows

Figure 2D:
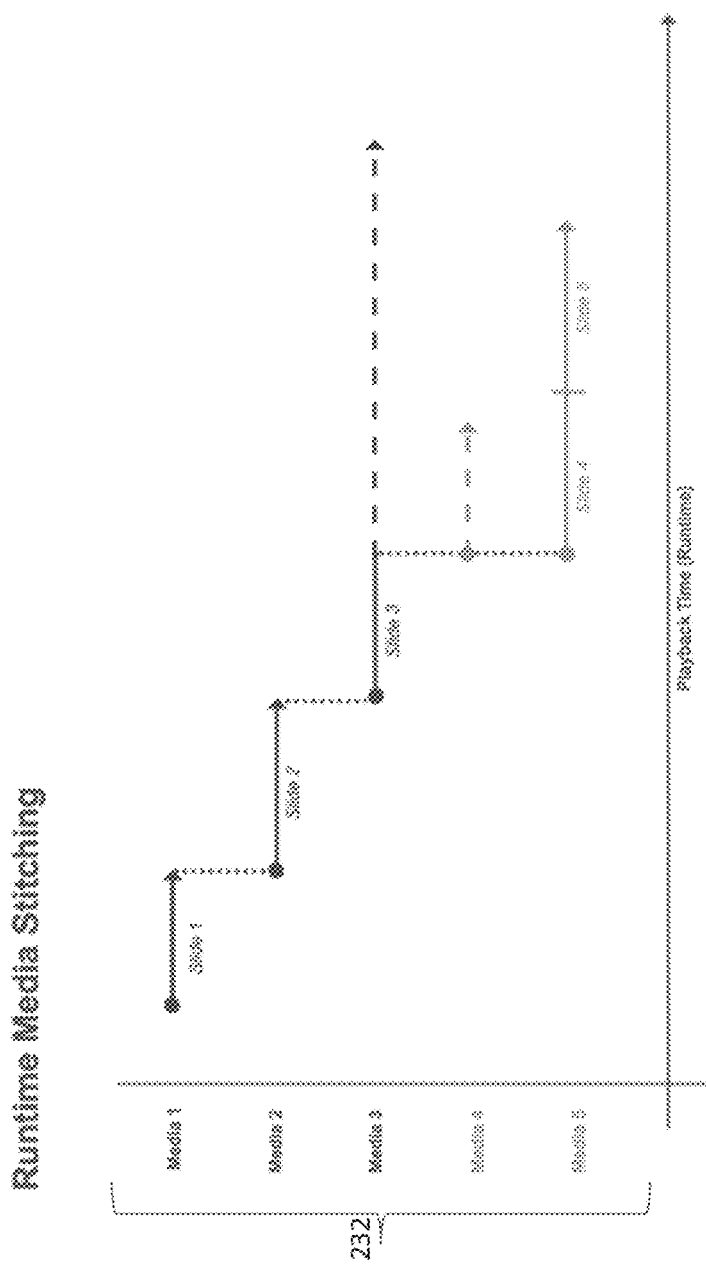
Figure 2E:
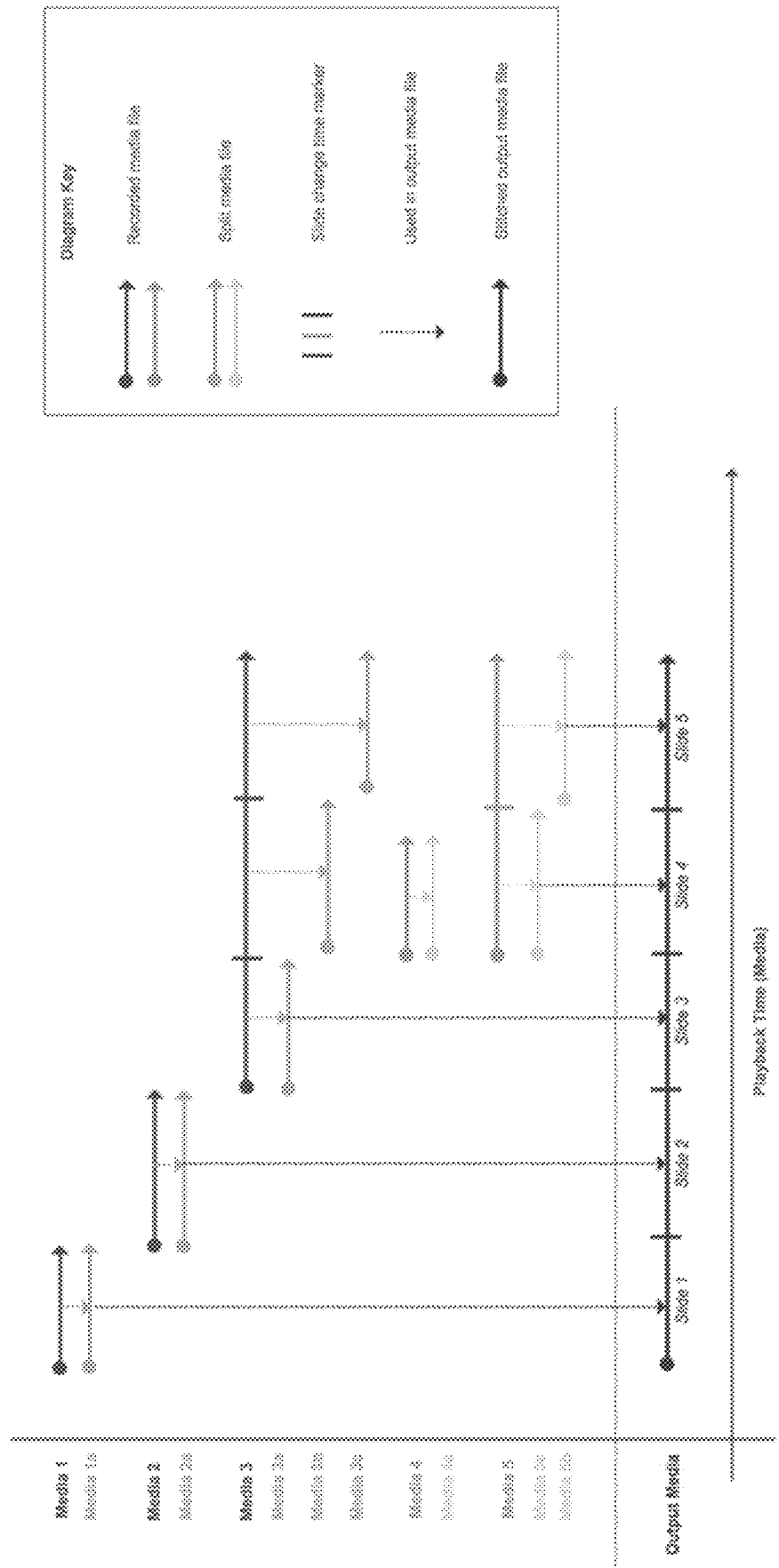

Because the Hybrid Recording workflow 220, for instance, can be more sophisticated than the Continuous Recording 200 and Slide-by-slide Recording 210 workflows, the technical implementation to support playback of online presentations recorded with this workflow can be more complex. In particular, the recorded media streams, which may apply to just a single slide image, or multiple slide images, must be stitched together into a continuous playback experience for the viewer, and the slide image changes must be triggered at the appropriate times. The diagrams in FIGS. 2D and 2E illustrates two models of this example process, where the first one 230 may be conventional and expend more computational/bandwidth resources than the second 240; where the second 240 is an example embodiment of the present invention.

In the runtime media stitching workflow example 230, a runtime player application dynamically switches between the different media streams 232 to play the appropriate slices for each slide image. For example, when the runtime application detects the end of the playing media stream, it switches to start playing the beginning of the next stream, and simultaneously switches to display the next slide image. If a single media stream is used for multiple slide images, the player monitors the playback of the media and displays each slide image according to time markers. Some media streams that were recorded with the Hybrid Recording workflow 220, or in some cases particular sections of those media streams, may not be played because other recorded media streams superseded them.

An embodiment of the present invention includes pre-processed media stitching technology 240. In the example of the inventive pre-processed media stitching 240, the client application preferably generates a single, continuous output media file and slide change time markers, composed of media stream slices split out from the original recorded files. After each media file is recorded, it is split into one or more separate media files that correspond with each slide image, based on the time markers indicated by the user during the recording process. These split media files are stored locally on the client device's memory storage, until the point when the user indicates that she has finished recording. At this point, the client application stitches together the individual split media files into a single output media file, and records the time markers of each slide change relative to the media file's timeline.

Media Stitching Network Diagrams

Figure 2F:
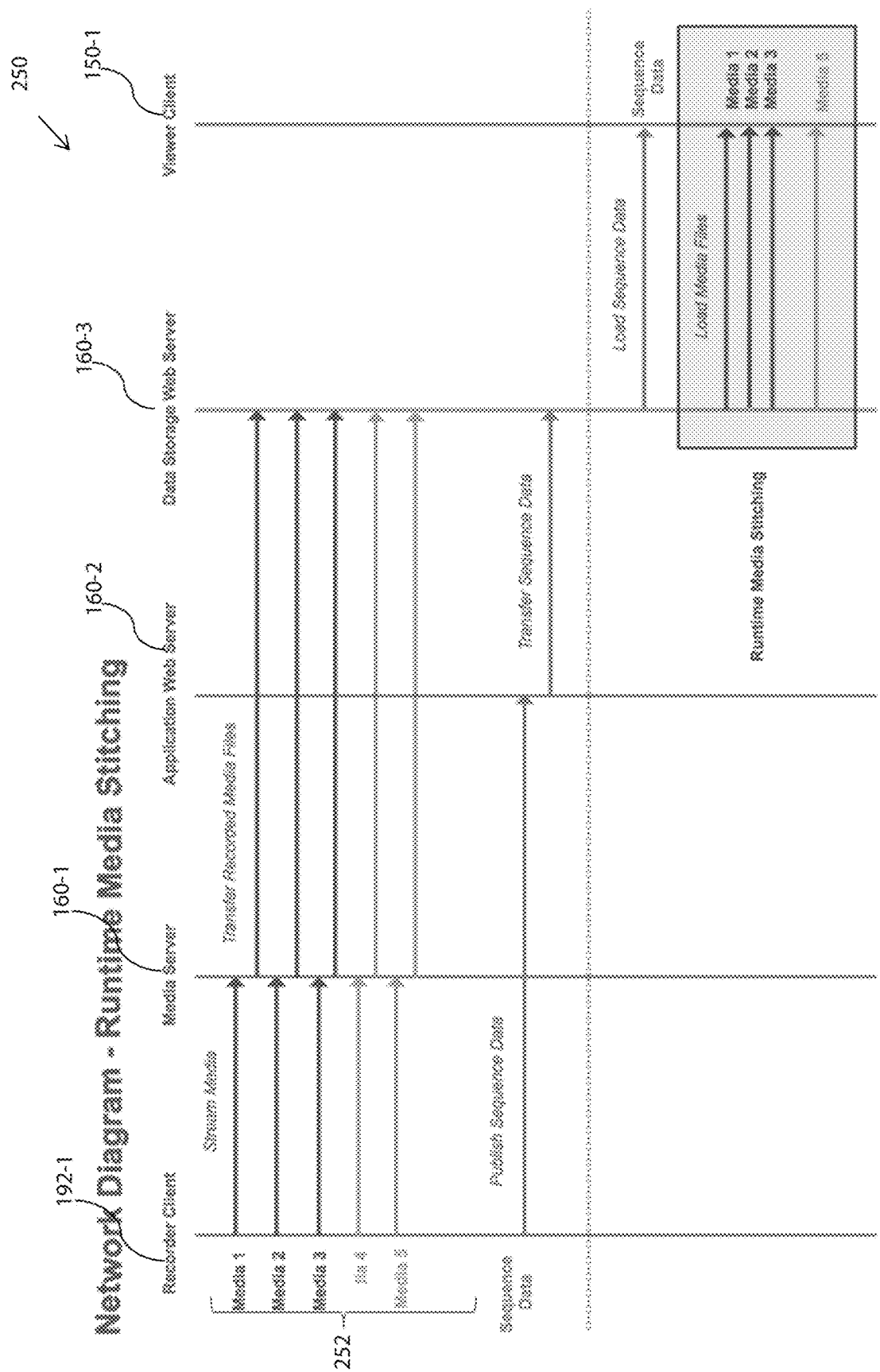
Figure 2G:
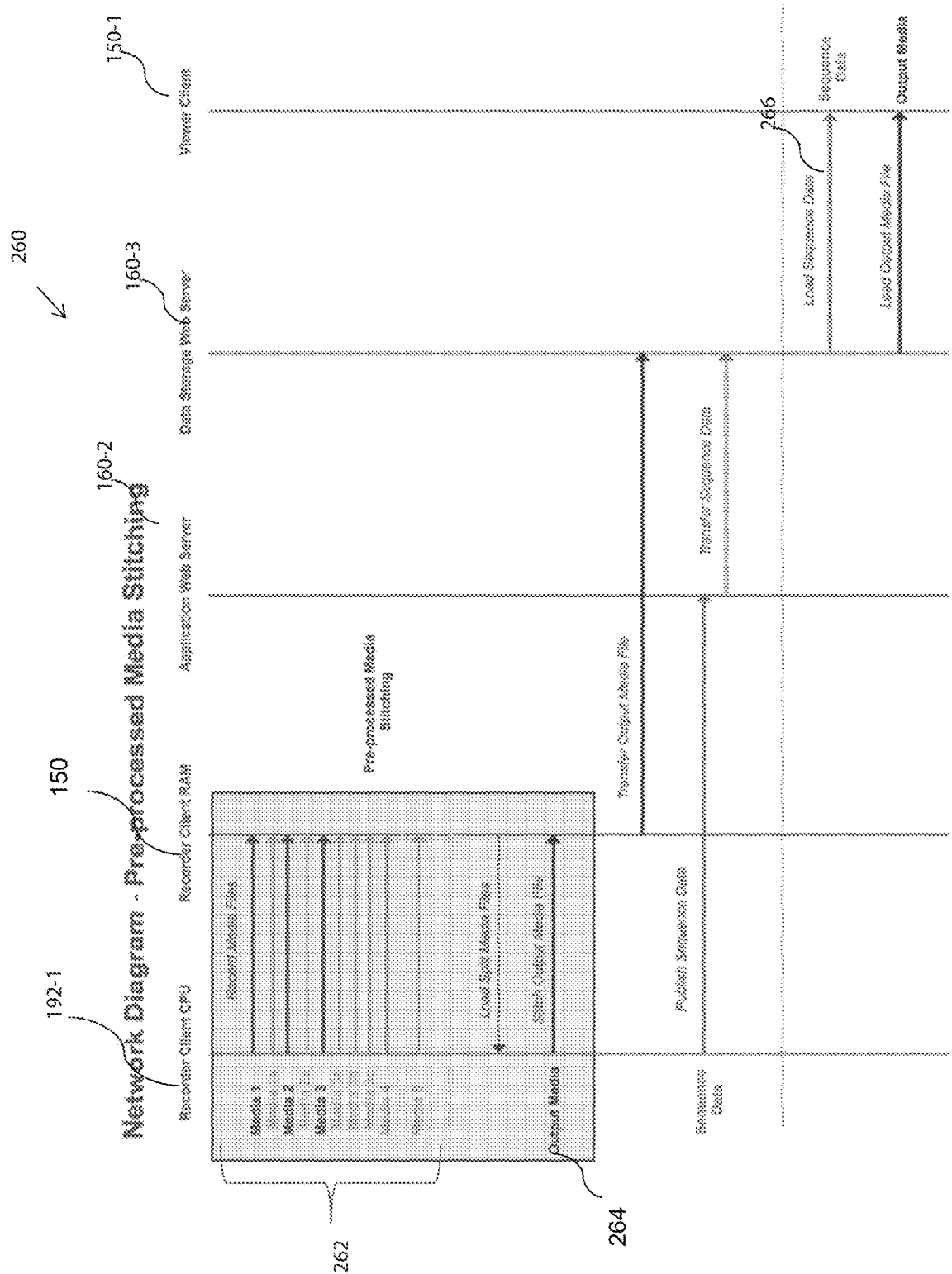

The two stitching workflows described above operate in two distinct network models, as illustrated in FIGS. 2F and 2G.

In one embodiment of the Runtime Media Stitching system 250, each media file 252 is streamed as it is recorded from the Recorder Client application 192-1 to a Media Server 160-1, which in turn stores the file on a Data Storage Web Server 160-3. After the recording process has been fully completed, the Recorder Client 192-1 uploads a Sequence Data file containing references to the media files 252 and the time markers for slide changes. The Viewer Client application 150-1 loads this data file, and then proceeds to load the media files as described in the Runtime Media Stitching workflow 230.

According to an aspect of the invention, the Pre-processed Media Stitching workflow example 260 is unique in part because the workflow 260 can perform the stitching process within the Recorder Client engine 192-1, and preferably only uploads a single output media file 264 according to an embodiment. All of the recorded media files and split media files 262 may be stored locally on the device 150 in RAM. When the user completes the recording process, these media files are stitched into a single output media file 264, which is uploaded directly to a Data Storage Web Server 160-3, without the need of an intermediary Media Server 160-2. The Sequence Data file 266 is uploaded, containing the time markers for each slide change relative to the output media file's 264 timeline. The Viewer Client 150-1 loads the Sequence Data 266 and then the output media file 264, and displays the slide images in synchronization with the media, based on the time markers.

FIGS. 4A-4D show example processes according to some embodiments of the invention. To begin, the presentation design application 192-n is launched, and the process flows to authenticate the user (402) and associate the relevant account and presentation(s). Media files may be accessed that are associated with the user. For example, a library associated with the user account may be accessed, or the user's previous presentation design session may be reinstated and associated presentation/media files accessed. At 410, a livestream feed may be recorded, mapped and processed into the presentation in accordance with, for instance, the slides driving the stitching of livestream.

Figure 5:
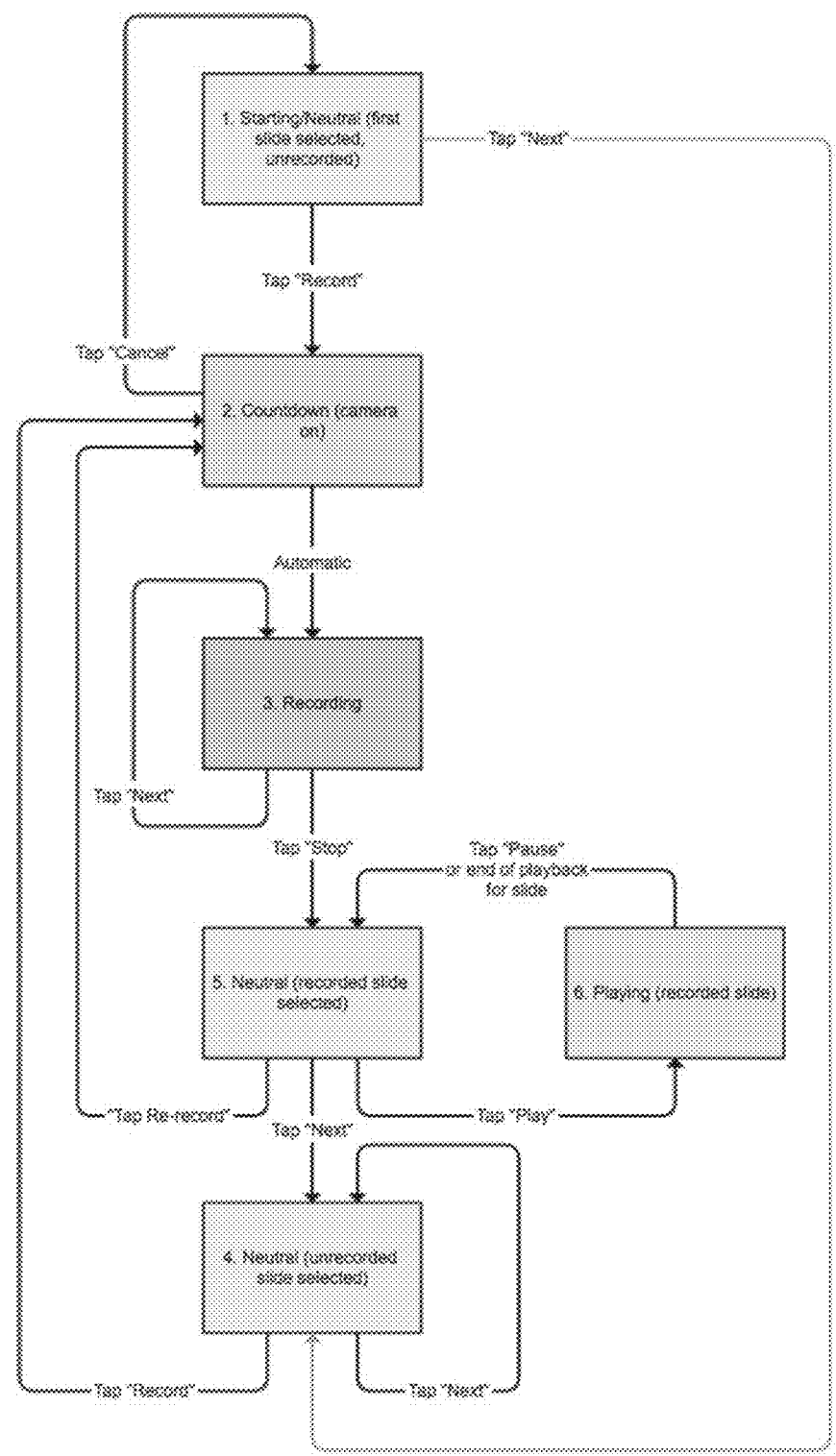
FIG. 5 is a flow diagram showing an example recording process according to an embodiment.

In one embodiment, the recording process may be implemented according to the embodiment of FIG. 5. Recordings may be sliced and the slices automatically mapped to slides, creating recorded slides. Multiple modes of recording may be provided.

With some embodiments of the inventive streaming media video/audio slide based production system, compelling online video presentations can be efficiently created on a mobile environment. In one example, the iPhone or iPad's native video camera and microphone may be used to add personal commentary to slides and images in an electronic presentation.

Example Implementations

Non-limiting example implementations of an aspect of the streaming media video/audio slide based production system follows:

1.) An app interface/plug-in (e.g. 192) may be used to facilitate opening any PowerPoint presentation from Mail attachments or cloud storage (such as Dropbox, Evernote, or Google Drive, e.g. 160/170);

2.) User turns on iPad microphone or camera (e.g. via 192) to record live audio or video narration, present invention editor allows user to easily go back and re-record live commentary on any slide or section.

3.) User may share it by emailing it, tweeting it, or posting it to LinkedIn, Twitter, Facebook, or Google Plus.

Example Features

Open PowerPoint files in streaming media video/audio slide based production system app from any other IOS application;

Use either the front-facing or rear-facing iPad camera;
Use either the built-in iPad microphone or a plug-in microphone
View current, next, and previous slides in a slide browser
Enter optional speaker notes for each slide using iPad's keyboard or iPad's speech-to-text capability
Preview presentation before publishing
Re-record commentary for any slide or section of presentation if a change is needed
Publishes presentations in seconds
Share multimedia presentation publicly or mark as private
Each finished presentation gets its own unique URL for sharing in email, on websites, or in blogs
Easy posting to LinkedIn, Twitter, Facebook, and Google Plus.
Track how the presentation is being viewed FIGS. 3A-3Y are example screenshots of a presentation authoring environment incorporating media stitching workflows according to certain embodiments of the production system.

Figure 3A:
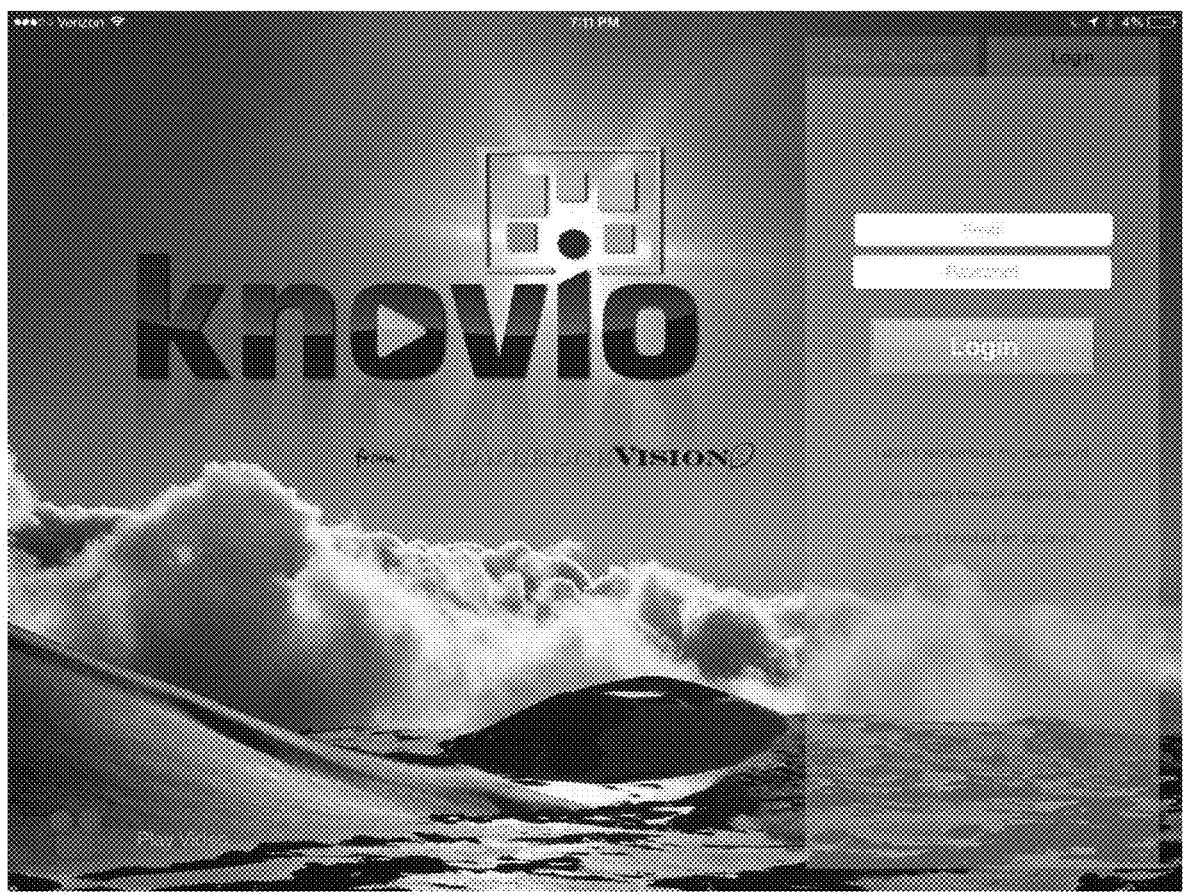
FIGS. 3A-3Y are screenshots of a presentation authoring environment incorporating media stitching workflows according to certain embodiments of the production system.
Figure 3B:
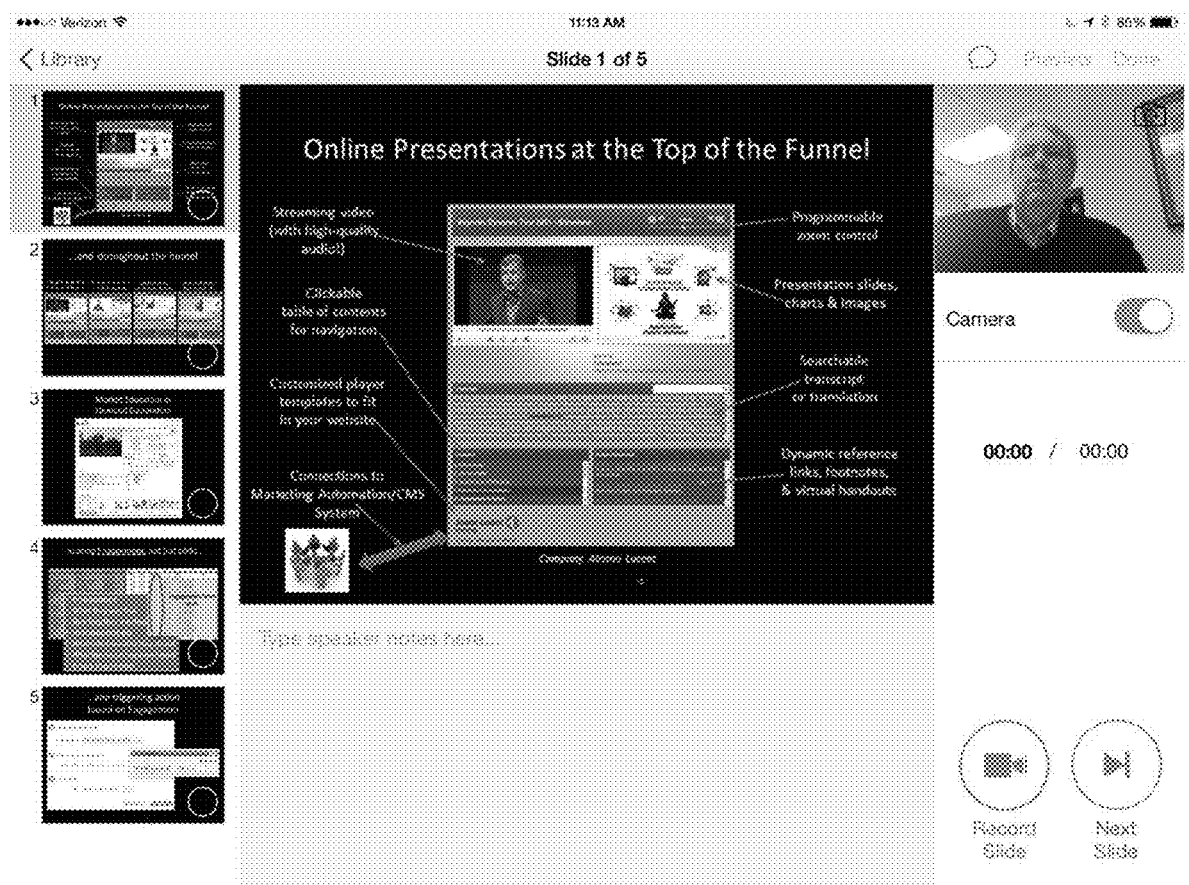
Figure 3C:
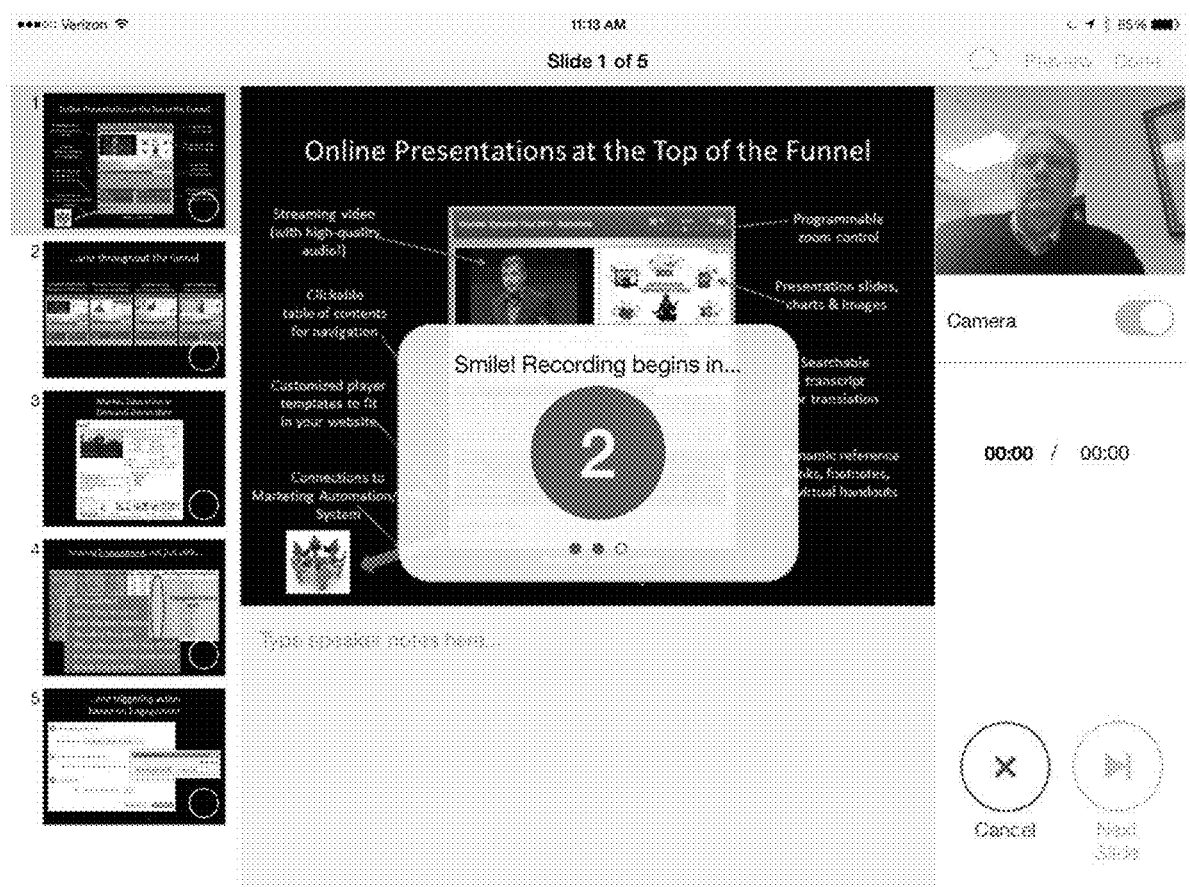
Figure 3D:
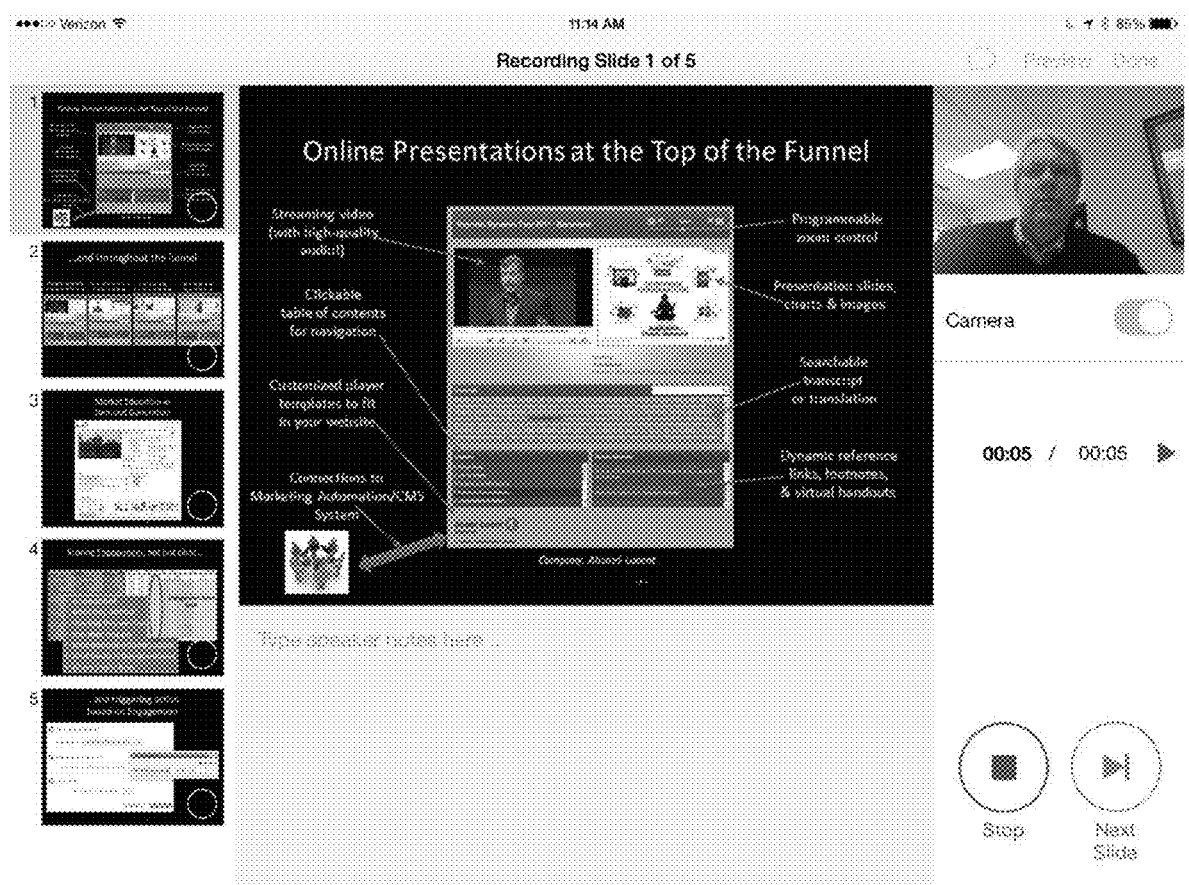
Figure 3E:
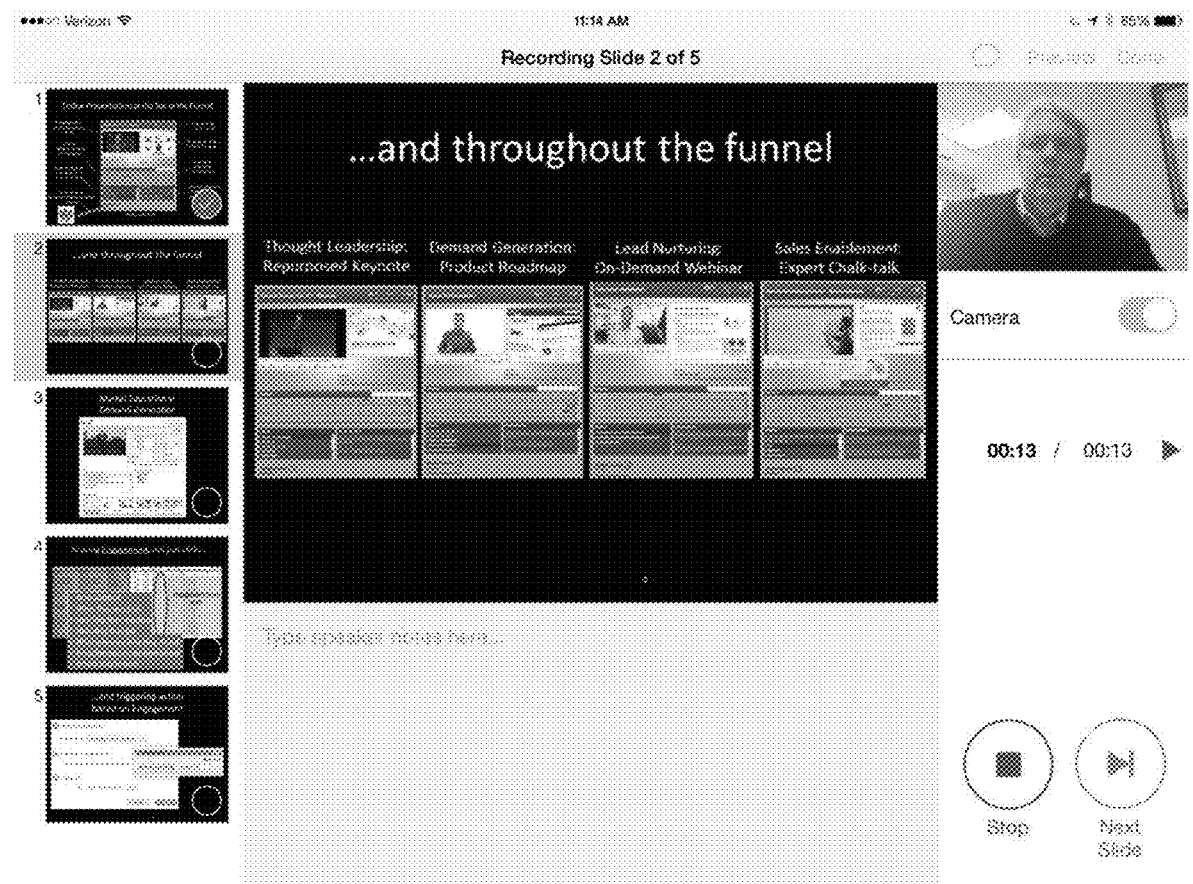

For instance, FIG. 3A shows an example sign-in screen in which a user may access the authoring environment of an aspect of the present invention. FIG. 3B shows an example record screen interface. At this point, the system is at a ready state, in which slides have been uploaded, and the live stream is ready to be recorded. In FIG. 3C, the record button has been selected/pressed on the example interface, and a countdown has begun to start the recording process. In FIG. 3D, the live stream is being recorded and an accompanying slide is being associated with the live stream. In FIG. 3E, the "next slide" button has been selected/pressed, which causes the current slide to advance to the second slide, while continuing video recording. In this way, the live stream may continuously be recorded, while markers are used to designate portions of the live stream associated with particular slides (images).

Figure 3F:
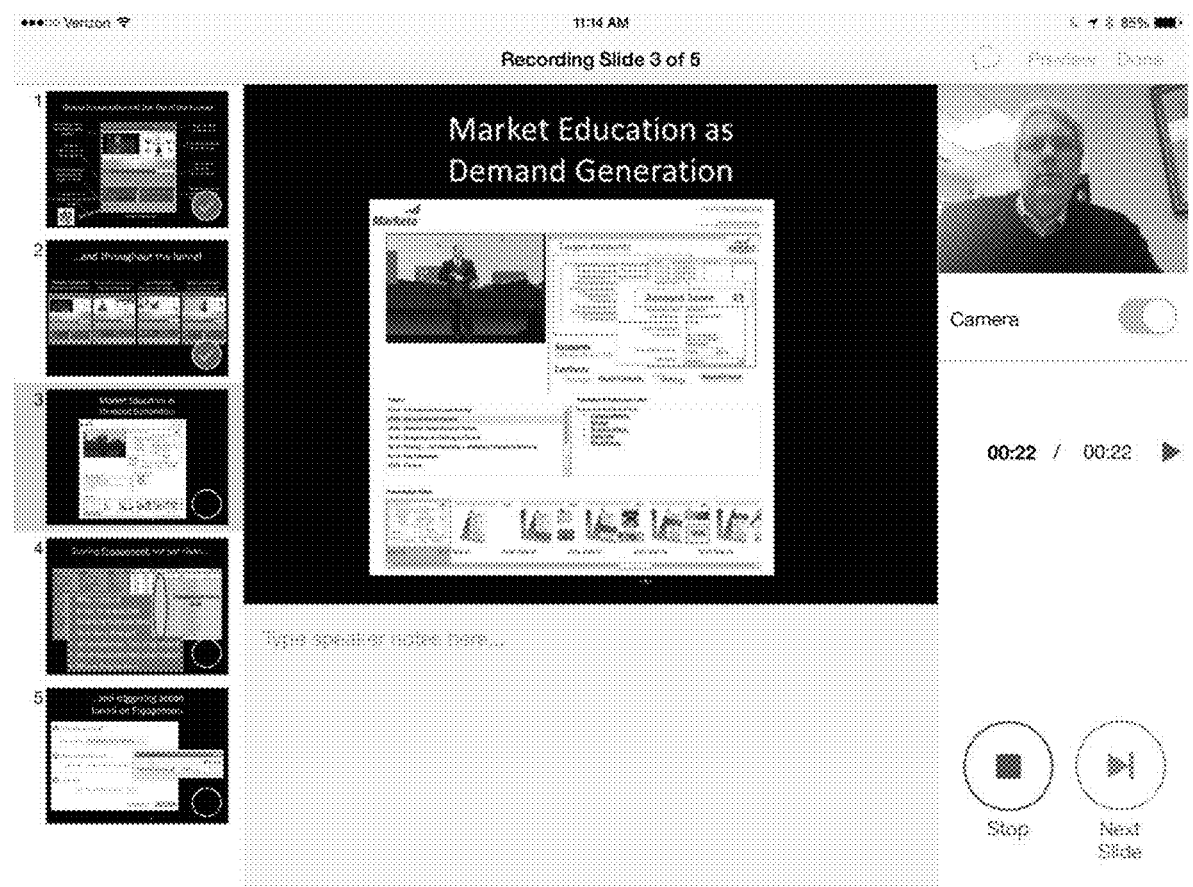

In FIG. 3F, the "next slide" button is pressed/selected, and the current slide advances to Slide #3.

Figure 3G:
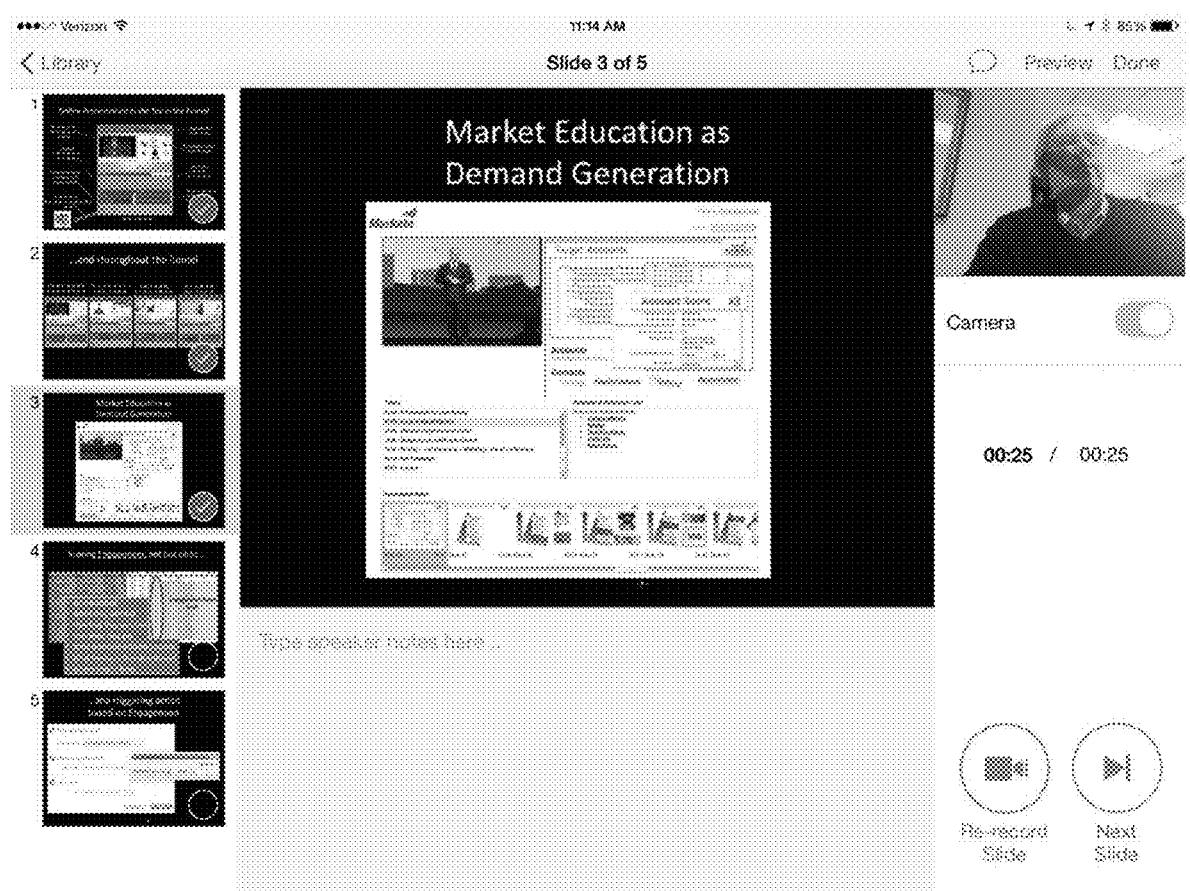

In FIG. 3G, the STOP button is selected/pressed while recording video to accompany Slide #3. In response to stopping recording of the live stream, the present embodiment returns to a ready state, which automatically causes the live stream video already recorded to be "sliced" into discreet slices—Video slice #1, #2, and #3. Video slice #3 (which was aborted while recording Slide #3) is cued and ready to play in a preview window with the PLAY button showing. In FIG. 3G the STOP button has changed to a "Re-Record Slide" button.

Figure 3H:
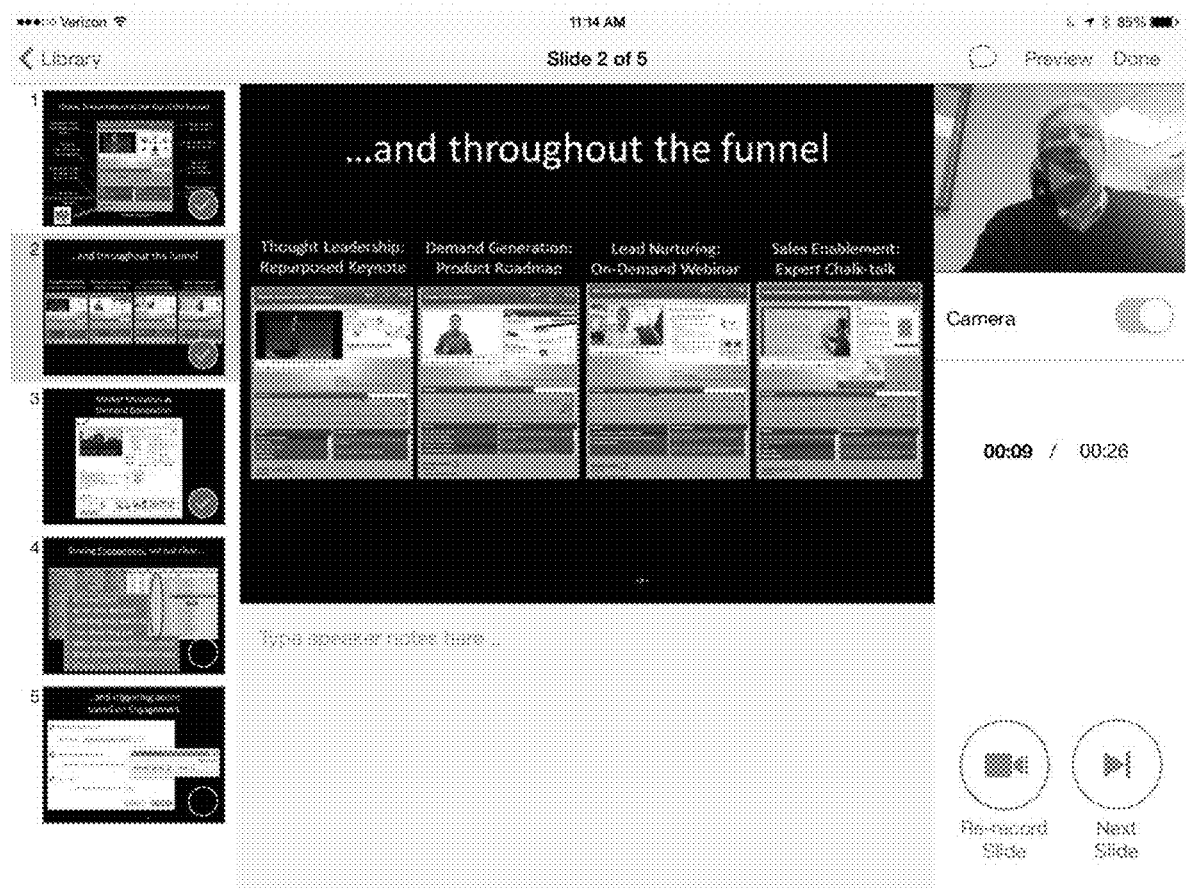

In FIG. 3H, Slide #2 is selected by the user by tapping on/selecting the thumbnail representing that slide. The preview window is responsive by displaying Video Slice #2, paused and ready to play. The timer shows the total recorded time up to the start of Slice #2 (in other words, the combined length of all previous slices—in this case, 0 minutes and 9 seconds) and the total length of all video recorded (Video Slice #1+#2+#3—in this case, 0 minutes and 26 seconds).

Figure 3I:
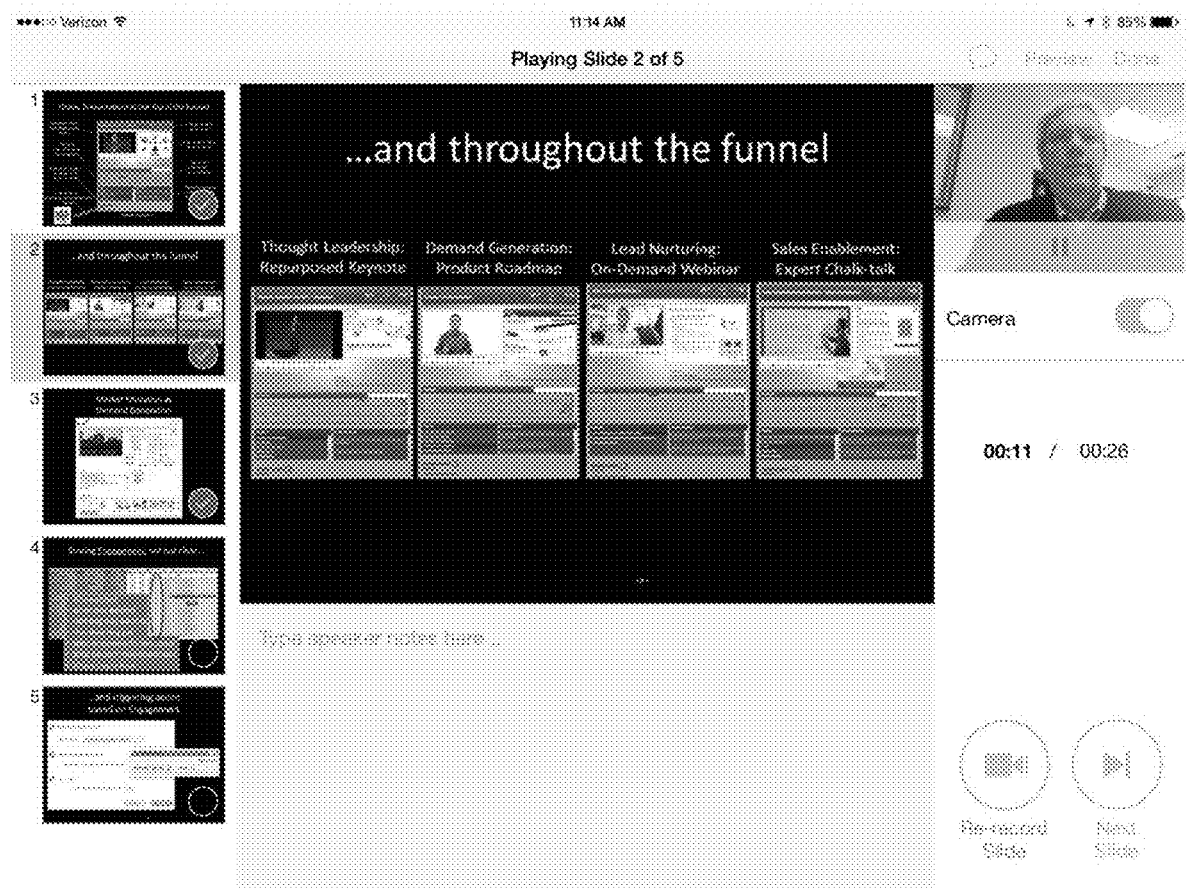

In FIG. 3I, the PLAY arrow is pressed in the preview window and Video Slice #2 plays from beginning to end in the preview window. Timer shows cumulative recorded time up until what is currently being shown (in this case, 11 seconds, since we are 2 seconds into Video Slice #2). A user may choose to re-record and substitute new video for Slice #2 by pressing the Re-record slide button.

Figure 3J:
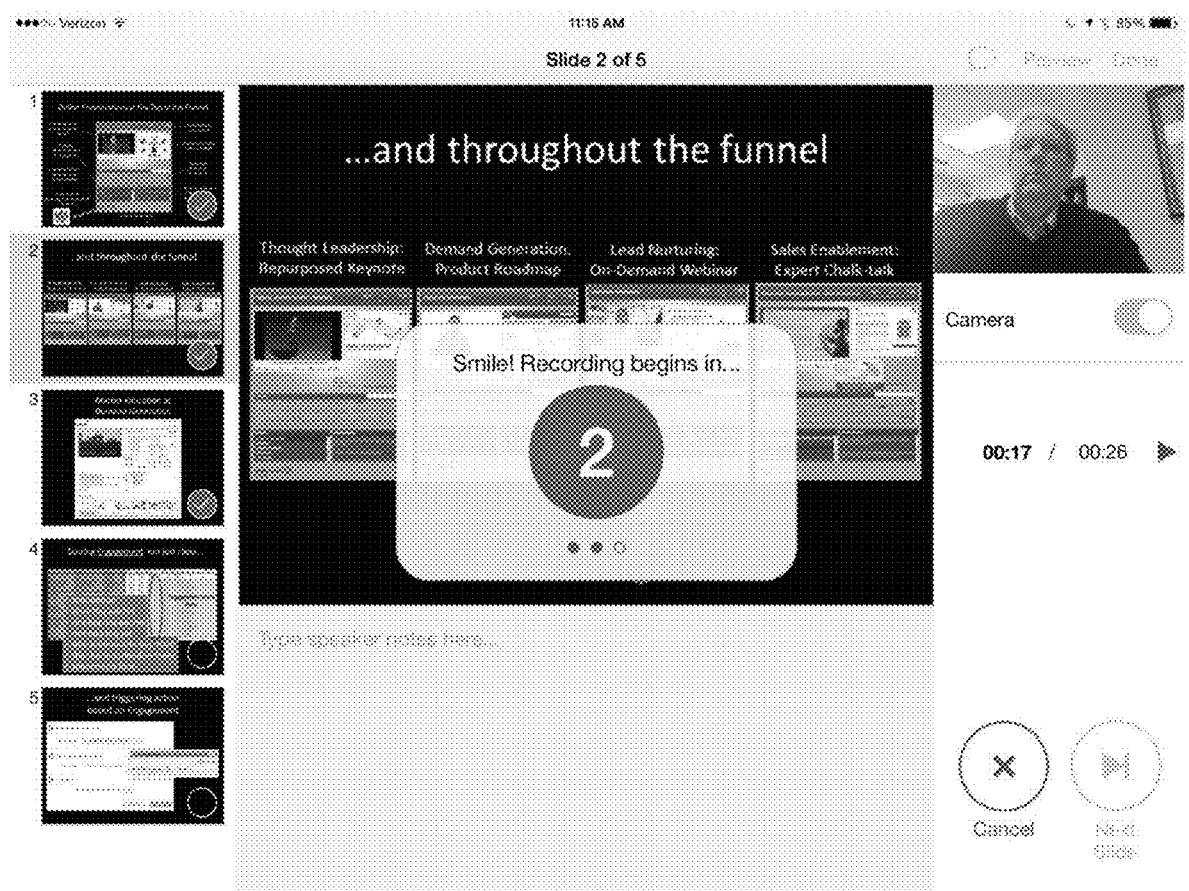

In FIG. 3J, the user has pressed the Re-Record Slide Button, and the application counts down to prepare the speaker to re-record his video commentary on Slide #2. During the countdown, the speaker hears the final three seconds of Video Slice #1, so that he can make a smooth transition to the first words that he will record for Slice #2.

Figure 3K:
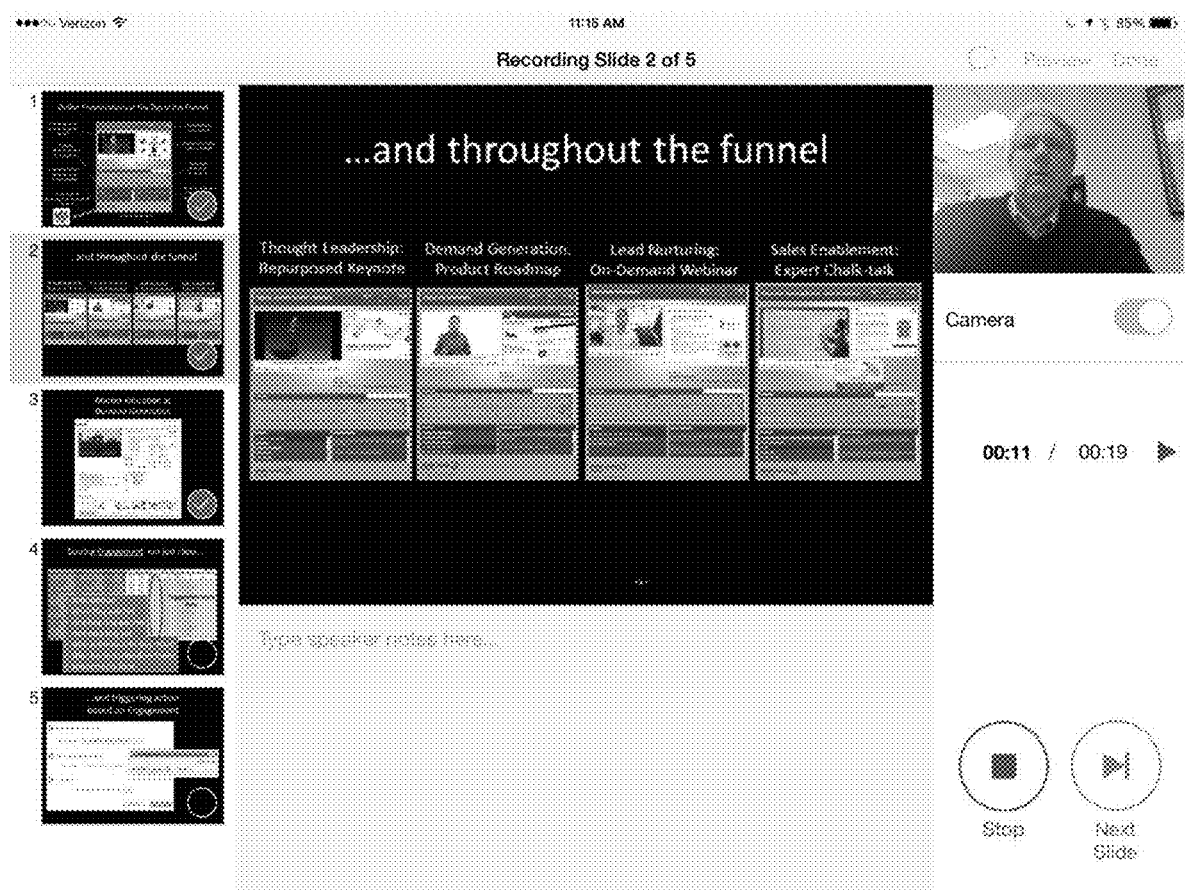
Figure 3L:
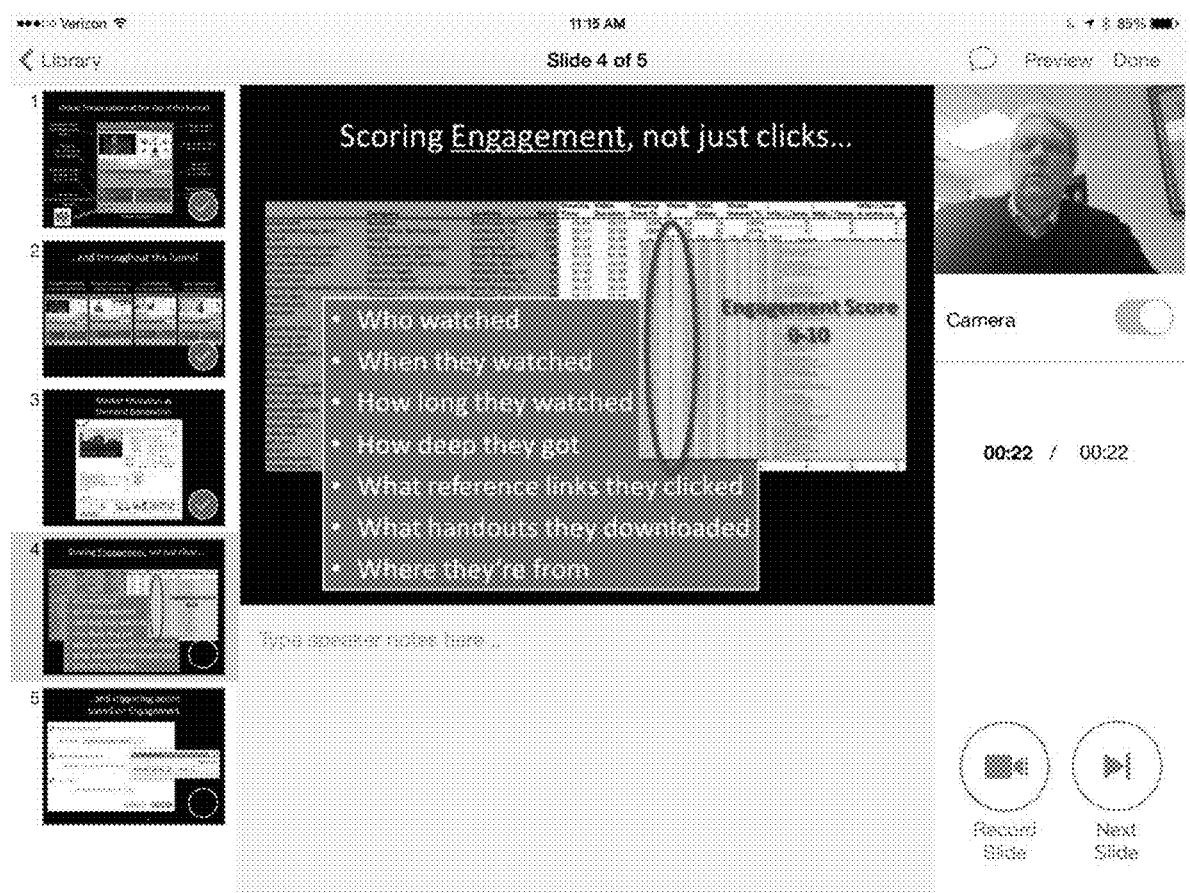

In FIG. 3K, the user is now recording a substitute video slice (Video Slice #2A) to replace Video Slice #2. At the end of his commentary for Slide #2, he has a choice: a.) press STOP, which will result in the program storing Video Slice #2A as the preferred version of commentary to accompany Slide #2; or b.) press NEXT SLIDE which will continue the substitute recording to accompany Slides #3, #4, etc.—for as long as a continuous recording is made. In the event that (b) is chosen in FIG. 3J, the "slicing" process described in FIG. 3G occurs for the new video, and each Slice #2A, #3A, #4B, is stored as the preferred version of commentary to accompany Slides 2, 3, and 4, respectively. According to an embodiment, during the production process (see FIG. 3L), the user may preferably always be able to choose between recording new commentary (as in this screen shot, where he is considering recording brand-new commentary for Slide 4) or choose to re-record video commentary for any previous slide or slides in the presentation.

Figure 3M:
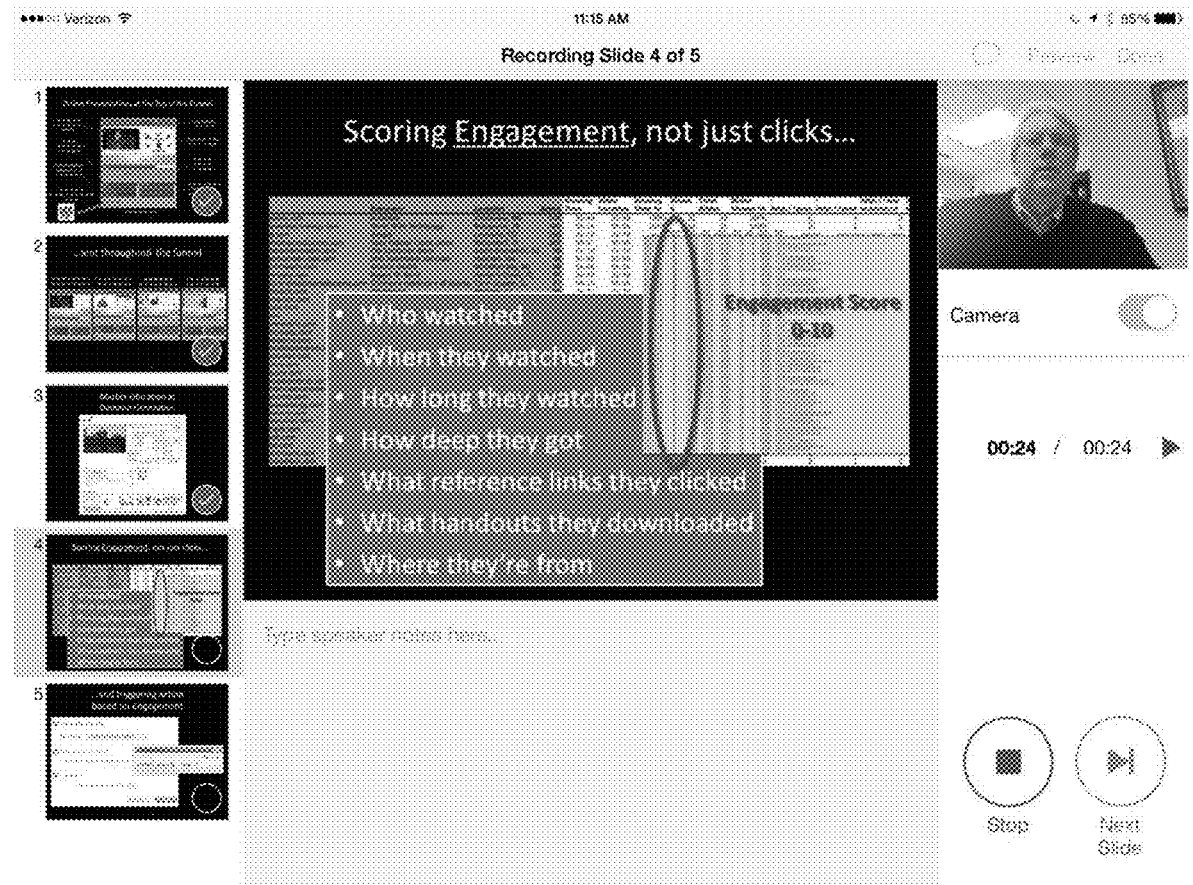

In FIG. 3M, as new recordings are made, the timer continually updates the length of the presentation to reflect the combined length of the preferred video slices (in this case, 24 seconds).

Figure 3N:
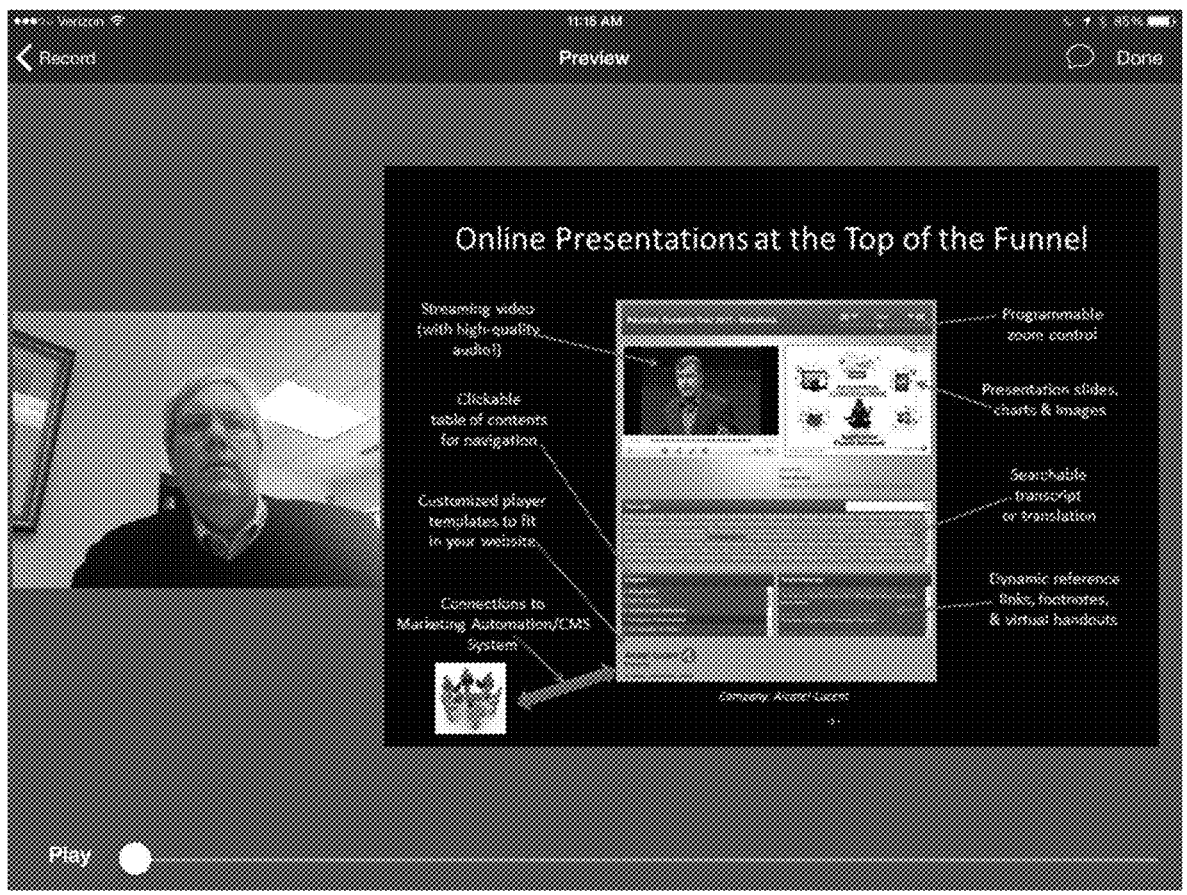
Figure 3O:
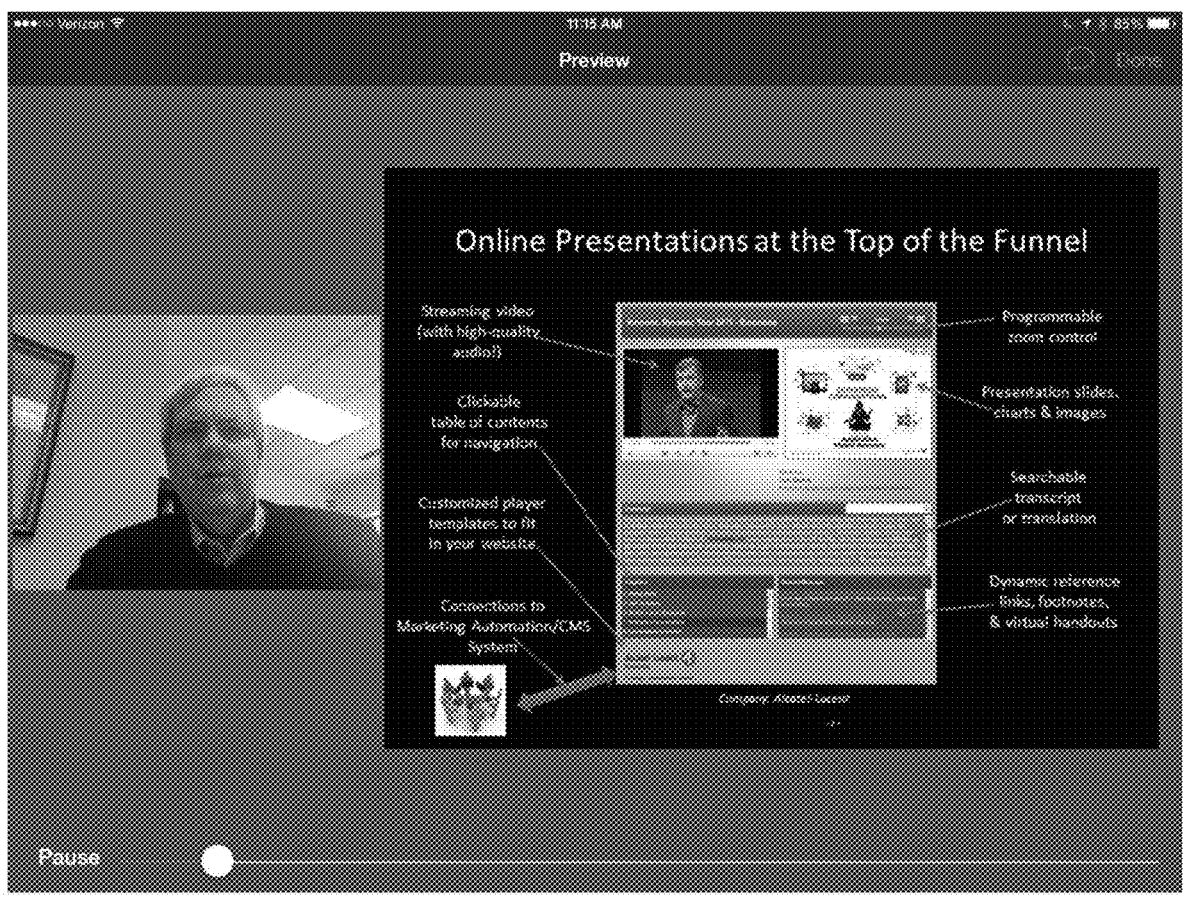
Figure 3P:
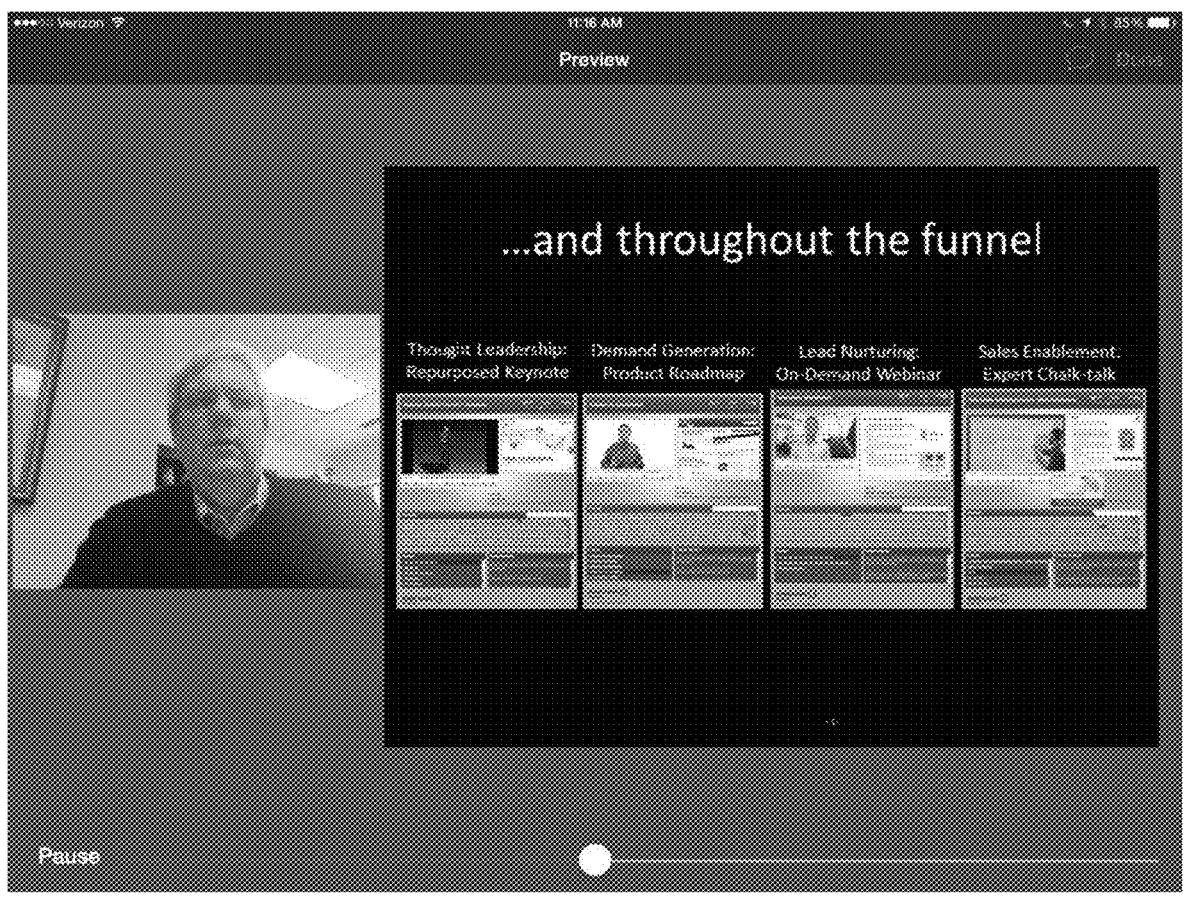
Figure 3Q:
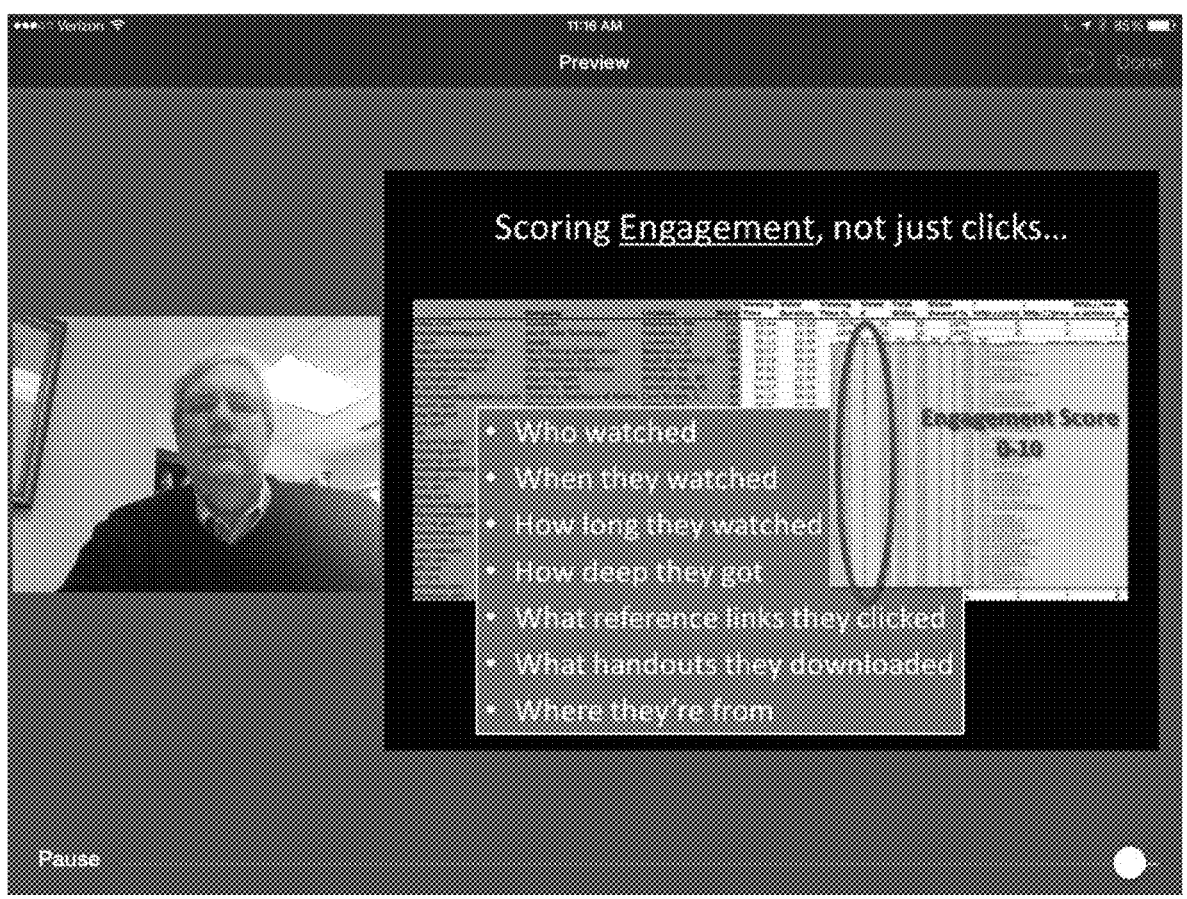

At any point, the user may choose to preview (see FIG. 3N) the entire presentation in a preliminary form. During preview, the presentation will play each preferred video slice in order. As shown in FIGS. 3O, 3P, 3Q, the preview simulates the flow of the completed presentation in that the experience is continuous or nearly continuous. However, since the video slices are still played as separate slices, they may be subject to slight delays between slices during preview playback. The user may return to the RECORD screen at any point during preview to further refine and re-record sections of the presentation.

Figure 3R:
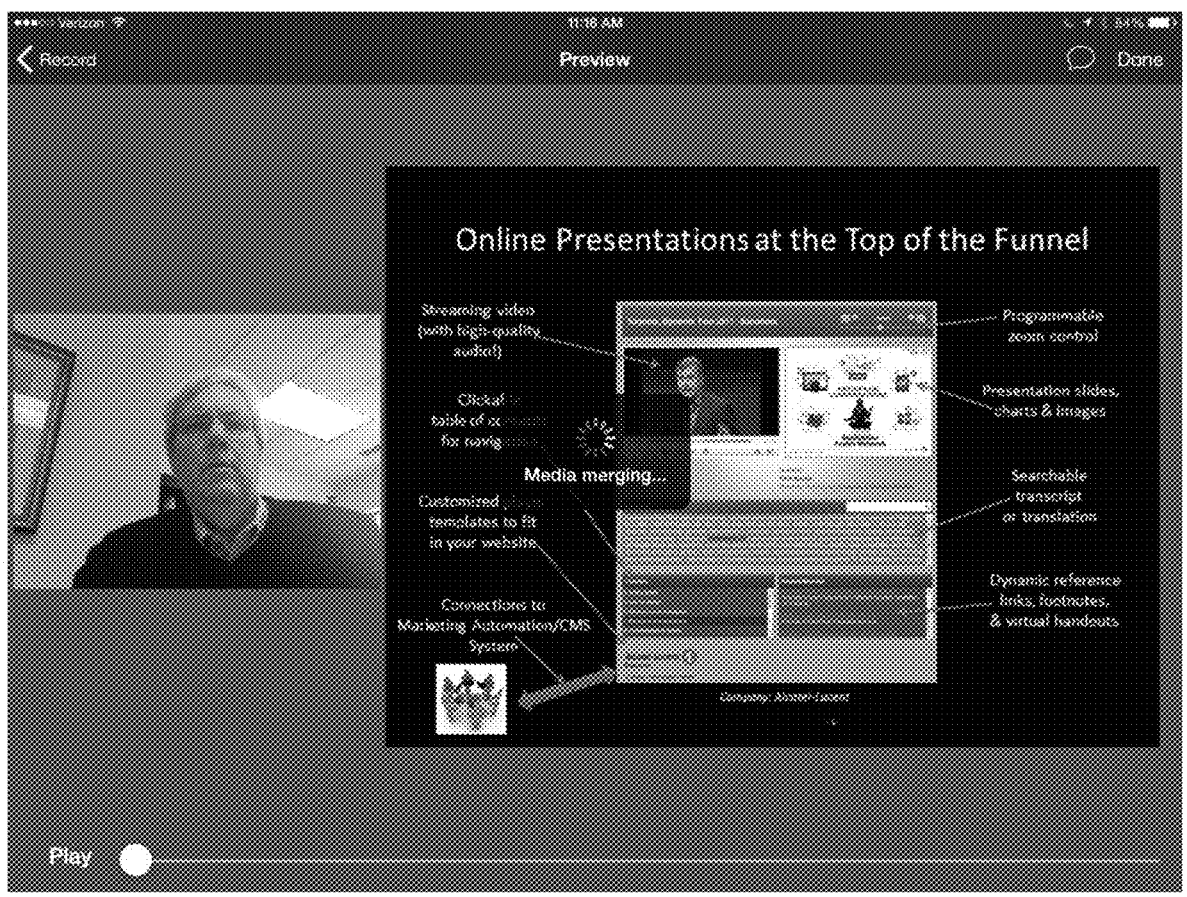

As shown in FIG. 3R, once the user is satisfied with the presentation as recorded, he presses DONE, and the separate video slices that are stored as the preferred slice for each slide are merged together (via concatenation) into a single video file (note the "Media merging" indicator in the center of the screen, identifying that this process is underway).

Figure 3S:
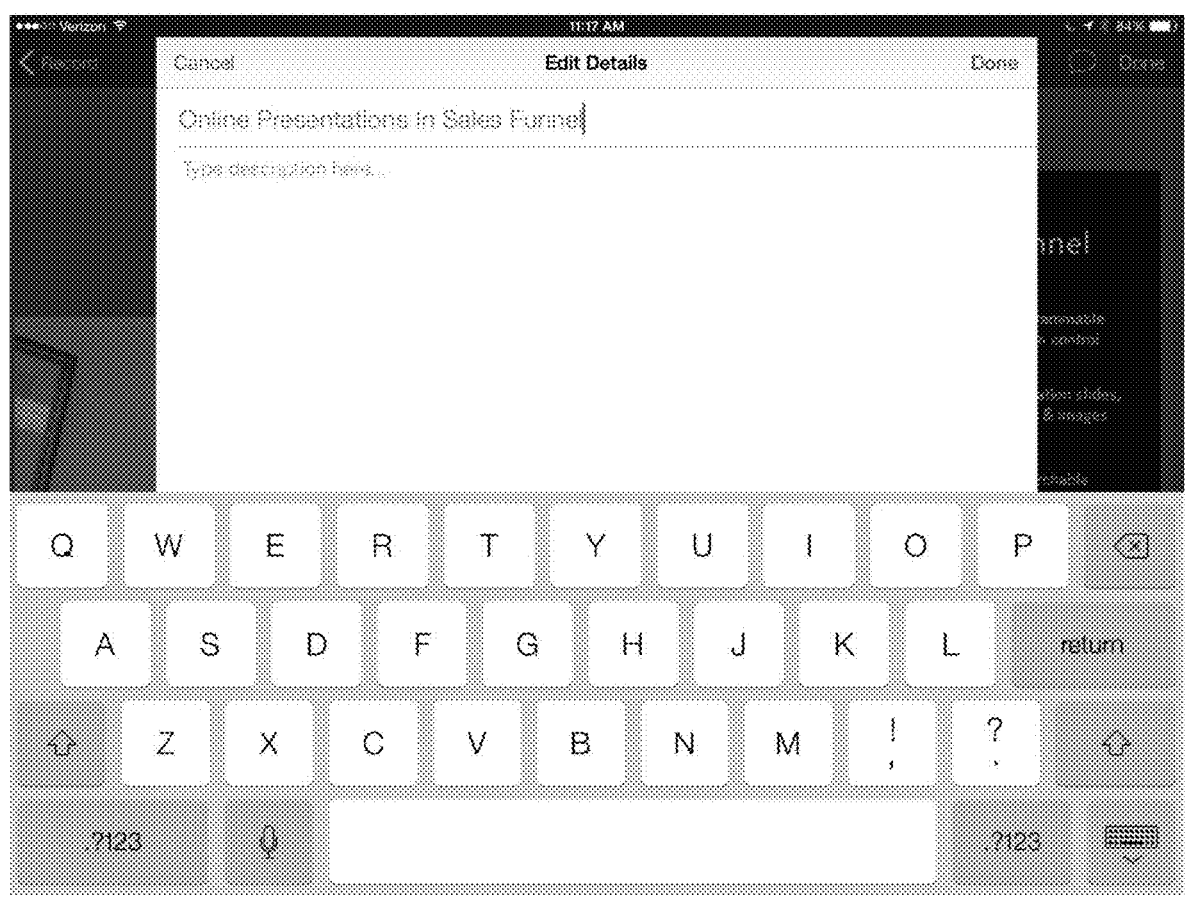
Figure 3T:
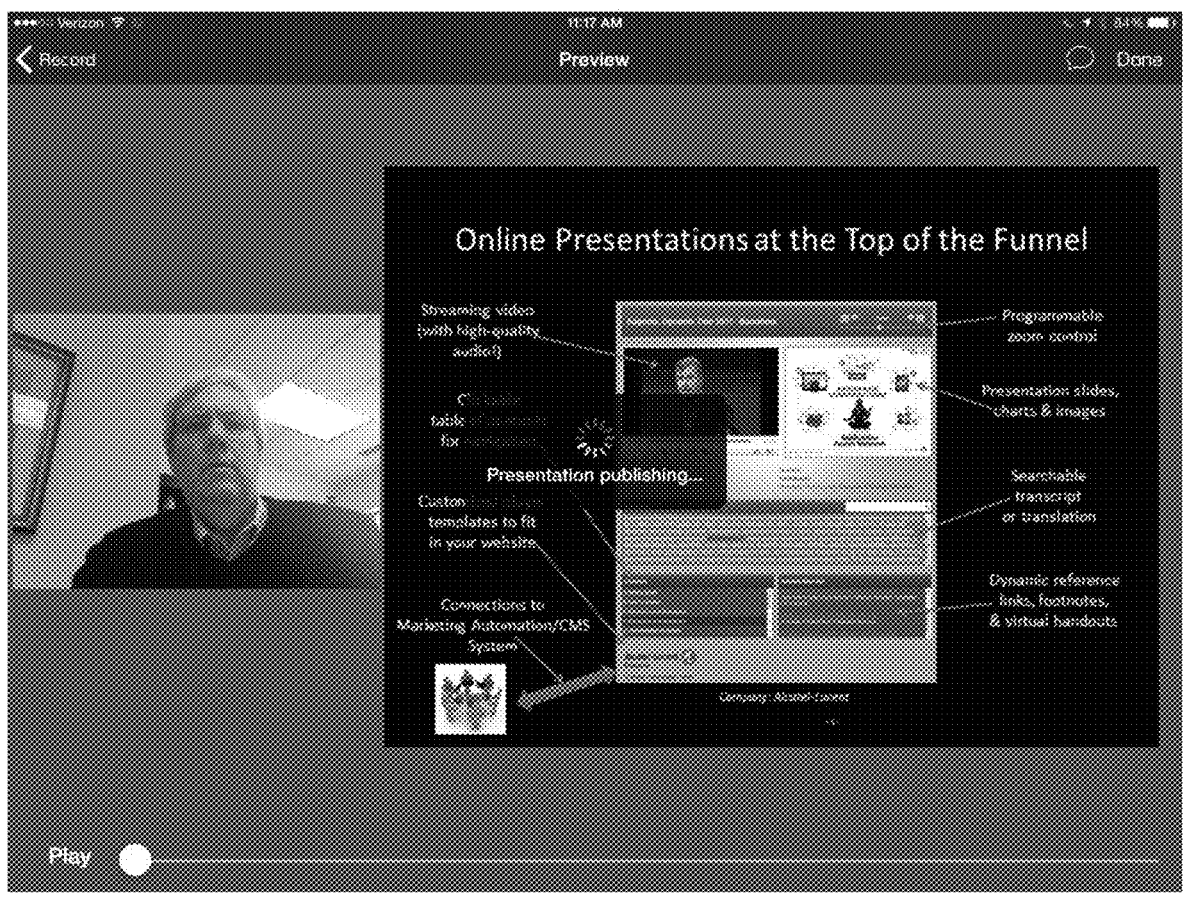

In FIG. 3S, the presentation is now associated with metadata—either user-entered such as a title and description or computer-generated such as the date and time recorded. In FIG. 3T, upon pressing/selecting DONE, the presentation is then "published"—that is, the merged video, recorded timings, and metadata are transmitted to servers on which they will be stored and merged with other data (such as slide images and user information) to be accessed by viewers. (Note the "Presentation publishing" indicator in the center of the screen.)

Figure 3U:
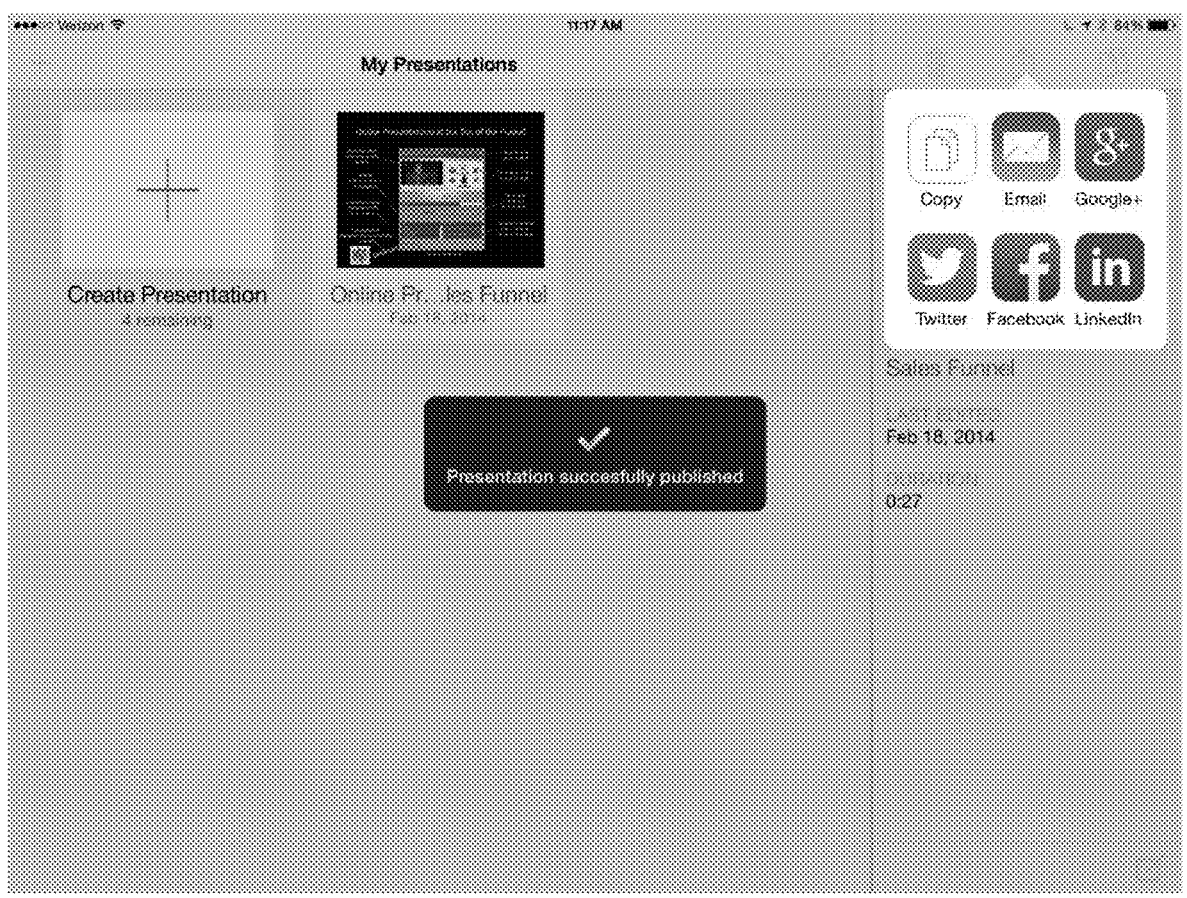

In FIG. 3U, the user is notified that the presentation has been successfully published, that it is now stored in an online library, and that it may be shared via email, social media, or other means.

Figure 3V:
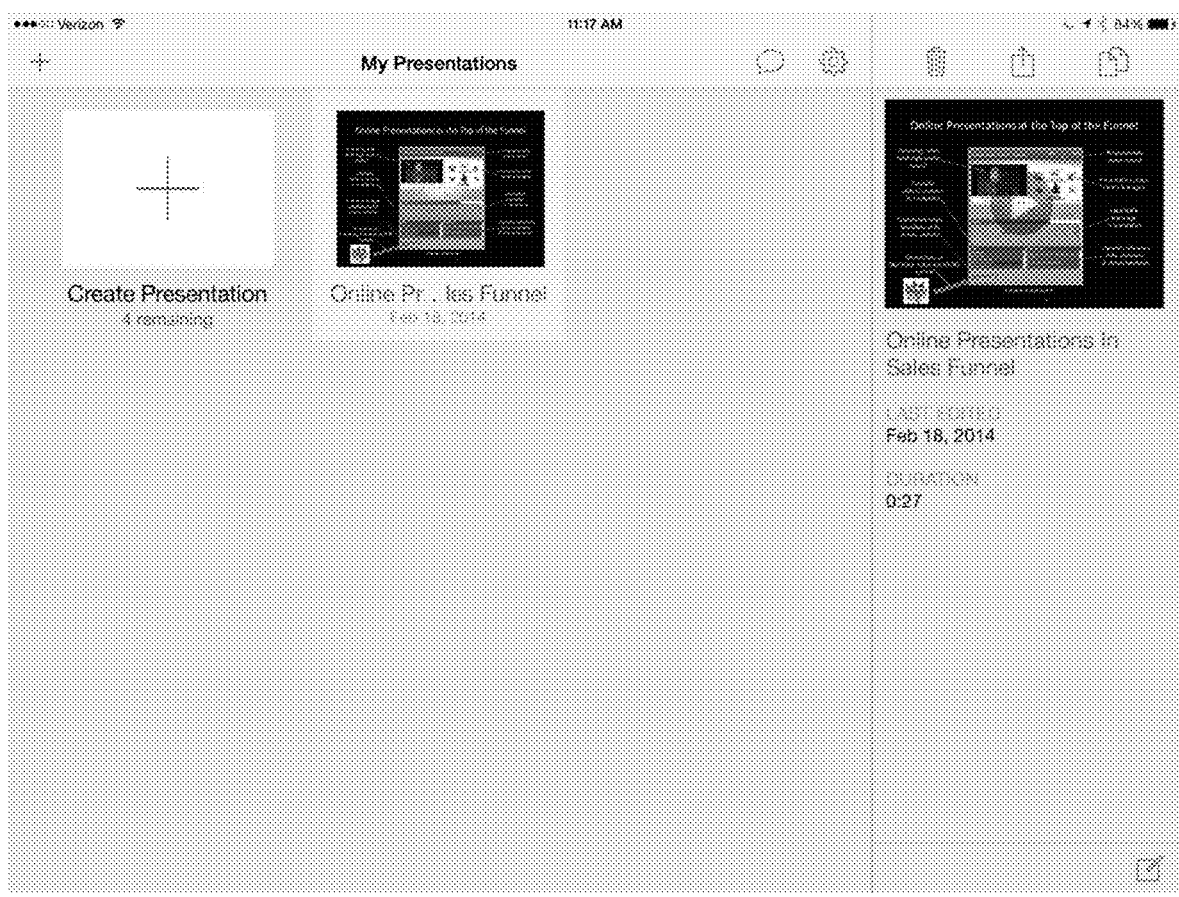

In FIG. 3V, the presentation is represented in the Library within the application.

Figure 3W:
Figure 3X:
Figure 3Y:
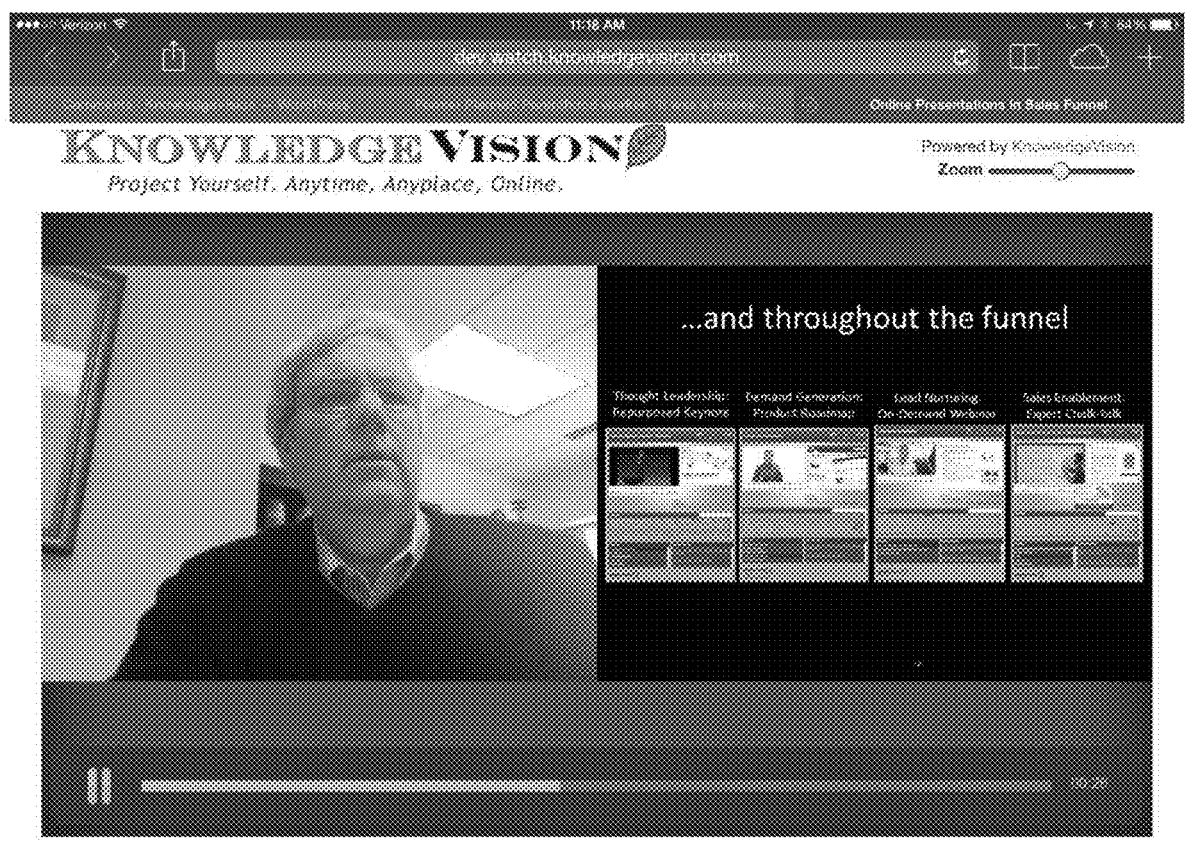
Figure 4A:
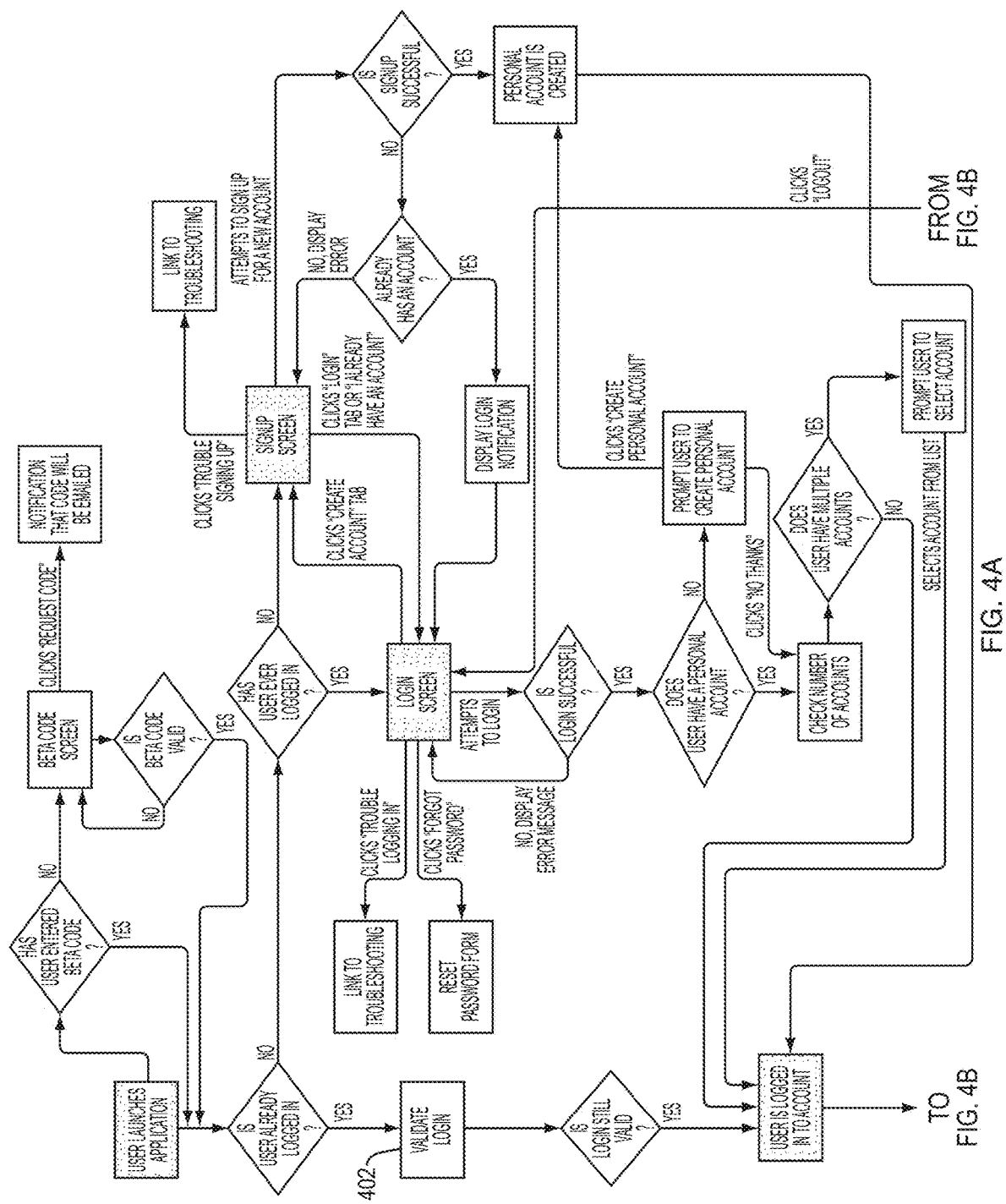
FIGS. 4A-4D show example processes according to some embodiments of the invention.
Figure 4B:
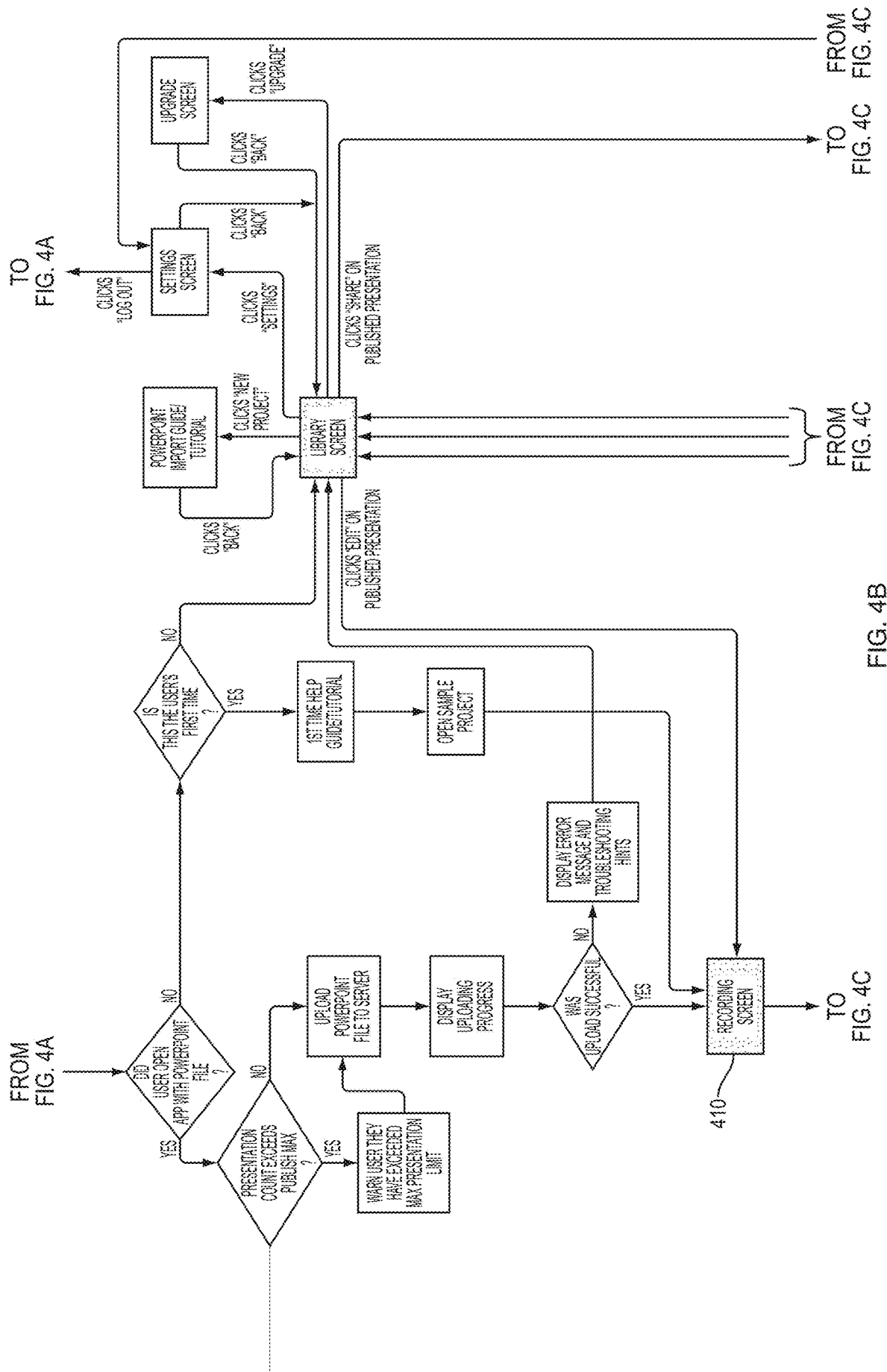
Figure 4C:
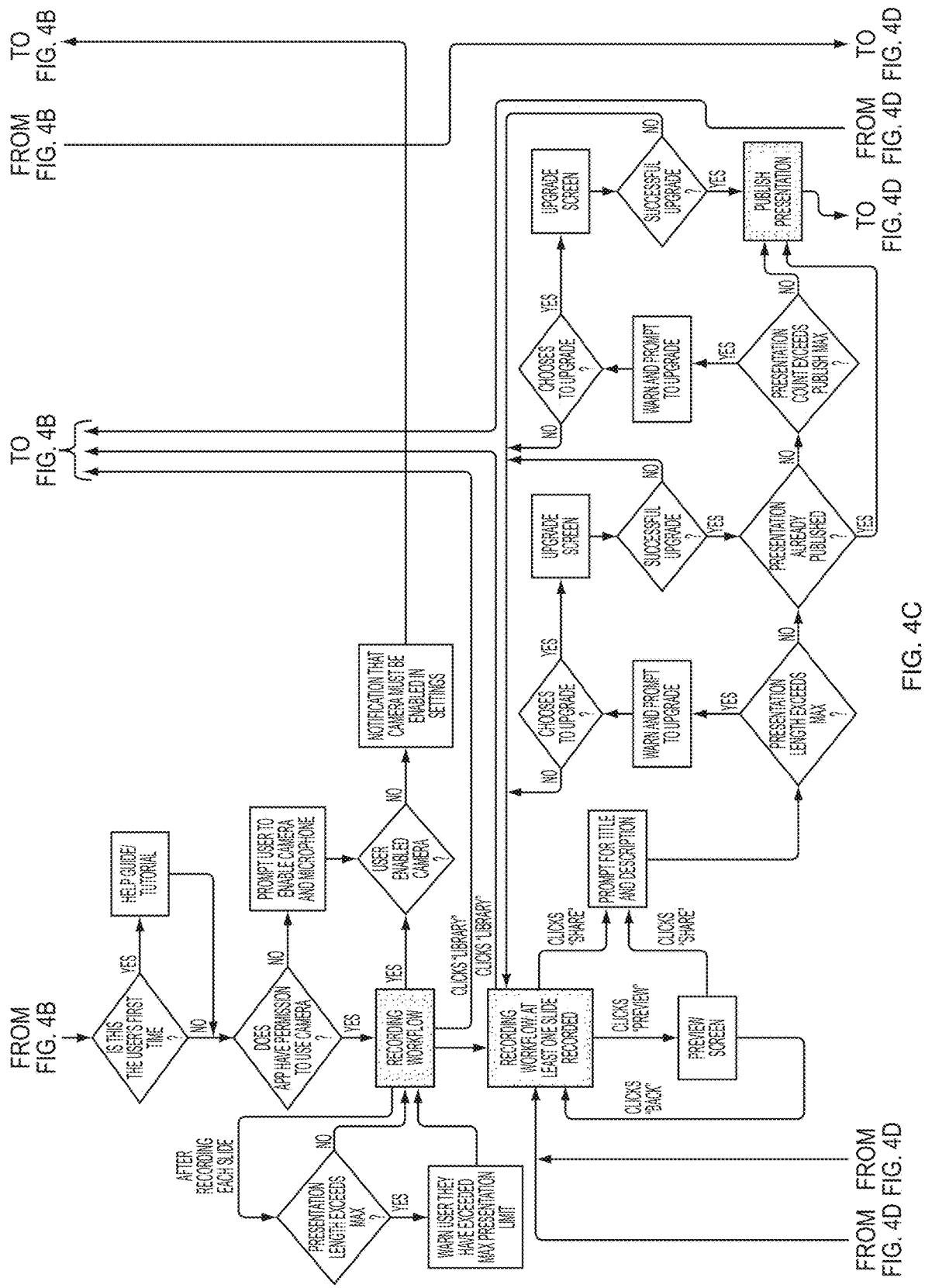
Figure 4D:
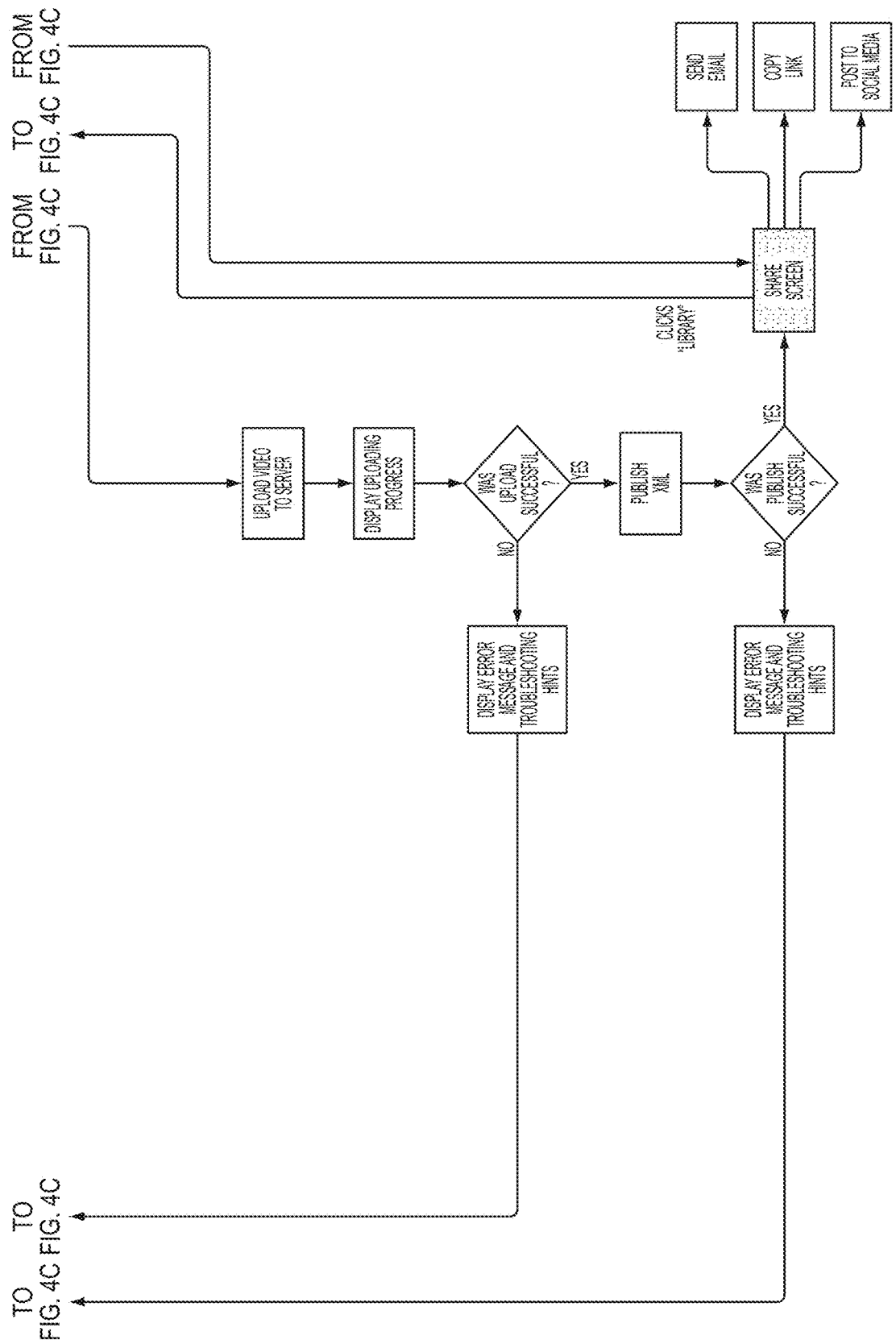

In FIGS. 3W, 3X, 3Y, the published presentation is being played back in a web browser. Because the video was merged (stitched) into a single file as in FIG. 3T, the viewer experience is that of a continuous video stream, with slide changes synchronized to that video stream, and not subject to the delays or pauses that might be present if the video were streamed as separate video files.

Recommendation System Analytics

Information related to session attributes or clickstream data related to the client system 150 or the performance of system components, e.g. the streaming media file, the player or the editing platform can be used to improve the quality of the preprocessor/stitching engine. For example, an analytics tool (such as a web analytics tool or business intelligence (BI) tool) may produce various metrics regarding the stitched media stream, and filter these results by time of day or time period or location. Such measures can be viewed per instance of a media stream accessed to help improve the preprocessing engine/agent/tool because the results may be aggregated across a multitude of instances of media streams.

While this invention has been particularly shown and described with references to example embodiments thereof, it will be understood by those skilled in the art that various changes in form and details may be made therein without departing from the scope of the invention encompassed by the appended claims.

For instance, while reference is made to the slide structure of the presentation driving the structure of the live media stream, it will be apparent to those skilled in the art that a predefined image, akin to a slide, may be used to structure the order of a slice of the streaming media, such that each image in the presentation can be used to mark/slice a portion of a streaming media to be associated with that image (that portion of the presentation). In this way, each preselected image may be used to respectively control the start/stop playback times of the streaming media, such that the preselected image is used to temporally slice the streaming media.

Furthermore, it will be apparent to one of ordinary skill that several types of third party systems are compatible with the production system for creating and updating an audio/video streaming media based slide presentation. The third party system may be, for example, a Learning Management System (LMS), Marketing Resource Management (MRM) system, Enterprise Marketing Management (EMM) system, Marketing Asset Management (MAM) system, or Customer Resource Management (CRM) system. Learning Management Systems, for instance, are often used to keep track of and create a catalogue of learning content and keep track of completion. Further, the presentation production client may be implemented as any type of development, management, configuration, or authoring software for a presentation.

Further example embodiments of the invention may be found in the U.S. Provisional Application No. 61/942,858, filed on Feb. 21, 2014 and its associated Appendix to which the present application claims the benefit and entirely incorporates by reference.

Further, examples of authoring software are disclosed in U.S. application Ser. No. 13/303,820, filed on Nov. 23, 2011, and U.S. application Ser. No. 13/838,136, filed on Mar. 15, 2013, the entire teachings of which are incorporated by reference.

Further, it should be noted that in some embodiments, the recorded media (audio or video content) may be recorded and preprocessed (stitched) in real-time. In a further example embodiment, the recorded media is prerecorded and thus is not a live recording.

What is claimed is:

1. A system for generating a presentation, the system comprising:
a processor; and
a memory with computer code instructions stored thereon, the processor and the memory, with the computer code instructions, causing the system to:
divide streaming media into a plurality of slices, such that each slice is segmented from the streaming media based on a respective slide designation of a slide of a slideshow;
stitch together a subset of the plurality of slices to form a media file and associate the media file with at least a portion of the slideshow and sequence data including time markers for slide changes relative to a timeline of the slideshow, such that the subset of the plurality of slices are stitched together in an order based on the respective slide designation of the slideshow of each slice of the subset; and
generate the presentation by associating the media file with a portion of the slideshow such that each slice of the subset is provided in the presentation based on its respective slide designation.

2. The system of claim 1, wherein in generating the presentation, the processor and the memory, with the computer code instructions, are further configured to cause the system to:
associate the media file with sequence data including time markers for slide changes.

3. The system of claim 1, wherein the processor and the memory, with the computer code instructions, are further configured to cause the system to:
store the slices in a local cache on a user's mobile device.

4. The system of claim 1, wherein the media is streaming media and the processor and the memory, with the computer code instructions, are further configured to cause the system to:
record the streaming media.

5. The system of claim 4, wherein the processor and the memory, with the computer code instructions, are further configured to cause the system to:
divide the streaming media into the plurality of slices automatically in response to detecting completing of recording the streaming media.

6. The system of claim 1, wherein the presentation is an interactive presentation and the processor and the memory, with the computer code instructions, are further configured to cause the system to:
structure the presentation with at least one of: chapters, footnotes, presentation slides, and action buttons.

7. The system of claim 1, wherein the processor and the memory, with the computer code instructions, are further configured to cause the system to:
configure the presentation to facilitate tracking of user clickstream data by including at least one key reference link in the presentation.

8. The system of claim 7, wherein the key reference link in the presentation is a footnote.

9. The system of claim 7, wherein the processor and the memory, with the computer code instructions, are further configured to cause the system to:
offer the key reference link to a user via the presentation to measure foreground and background activity of the user.

10. The system of claim 1, wherein the processor and the memory, with the computer code instructions, are further configured to cause the system to:
integrate the presentation with a tracking system to facilitate tracking of a user's clickstream data generated at a client system during playback of the presentation in a browser session;
monitor playback of the presentation by tracking session and clickstream data; and direct the tracked session and clickstream data to another system which responds by calculating an engagement score based on the user's session and clickstream data, the engagement score reflecting the user's level of engagement with the presentation, the calculated engagement score triggering a response from an automated third party system.

11. The system of claim 1 wherein the media is at least one of:
    audio media; and
    video media.

12. A computer implemented method for generating a presentation, the method comprising:
    dividing streaming media into a plurality of slices, such that each slice is segmented from the media based on a respective slide designation of a slide of a slideshow;
    stitching together a subset of the plurality of slices to form a media file and associate the media file with at least a portion of the slideshow and sequence data including time markers for slide changes relative to a timeline of the slideshow, such that the subset of the plurality of slices are stitched together in an order based on the respective slide designation of the slideshow of each slice of the subset; and
    generating the presentation by associating the media file with a portion of the slideshow such that each slice of the subset is provided in the presentation based on its respective slide designation.

13. The method of claim 12 wherein generating the presentation further includes:
    associating the media file with sequence data including time markers for slide changes.

14. The method of claim 12 further comprising:
    storing the slices in a local cache on a user's mobile device.

15. The method of claim 12 wherein the media is streaming media and the method further comprises:
    recording the streaming media; and
    dividing the streaming media into the plurality of slices automatically in response to detecting completing of recording the streaming media.

16. The method of claim 12 further comprising:
    structuring the presentation with at least one of: chapters, footnotes, presentation slides, and action buttons.

17. The method of claim 12 further comprising:
    configuring the presentation to facilitate tracking of user clickstream data by including at least one key reference link in the presentation.

18. The method of claim 17 further comprising:
    offering the key reference link to a user via the presentation to measure foreground and background activity of the user.

19. The method of claim 12 further comprising:
    integrating the presentation with a tracking system to facilitate tracking of a user's clickstream data generated at a client system during playback of the presentation in a browser session;
    monitoring playback of the presentation by tracking session and clickstream data; and
    directing the tracked session and clickstream data to another system which responds by calculating an engagement score based on the user's session and clickstream data, the engagement score reflecting the user's level of engagement with the presentation, the calculated engagement score triggering a response from an automated third part system.

20. The method of claim 12 wherein the media is at least one of:
    audio media; and
    video media.

21. A non-transitory computer-readable medium configured to store instructions, the instructions, when loaded and executed by a processor, causes the processor to:
    divide streaming media into a plurality of slices, such that each slice is segmented from the streaming media based on a respective slide designation of a slide of a slideshow;
    stitch together a subset of the plurality of slices to form a media file and associate the media file with at least a portion of the slideshow and sequence data including time markers for slide changes relative to a timeline of the slideshow, such that the subset of the plurality of slices are stitched together in an order based on the respective slide of the slideshow designation of each slice of the subset;
    generate the presentation by associating the media file with a portion of the slideshow such that each slice of the subset is provided in the presentation based on its respective slide designation.

* * * * *